(12) United States Patent
Hooton et al.

(10) Patent No.: US 10,955,992 B2
(45) Date of Patent: Mar. 23, 2021

(54) SYSTEM AND METHODS FOR IMPLEMENTING VISUAL INTERFACE FOR USE IN SORTING AND ORGANIZING RECORDS

(71) Applicant: NetSuite Inc., San Mateo, CA (US)

(72) Inventors: Robin Daniel Hooton, Sydney (AU); Suhas Rohit Mehta, Santa Clara, CA (US); Alan David Minsk, Kirkland, WA (US)

(73) Assignee: NETSUITE INC., San Mateo, CA (US)

( * ) Notice: Subject to any disclaimer, the term of this patent is extended or adjusted under 35 U.S.C. 154(b) by 1042 days.

(21) Appl. No.: 15/002,251

(22) Filed: Jan. 20, 2016

(65) Prior Publication Data
US 2017/0235436 A1    Aug. 17, 2017

Related U.S. Application Data

(60) Provisional application No. 62/106,321, filed on Jan. 22, 2015.

(51) Int. Cl.

| | |
|---|---|
| *G06F 3/0482* | (2013.01) |
| *H04L 29/08* | (2006.01) |
| *G06Q 10/06* | (2012.01) |
| *H04L 29/06* | (2006.01) |
| *G06F 3/0481* | (2013.01) |
| *G06F 3/0486* | (2013.01) |

(52) U.S. Cl.
CPC .......... *G06F 3/0482* (2013.01); *G06F 3/0486* (2013.01); *G06F 3/04817* (2013.01); *G06Q 10/063* (2013.01); *H04L 67/02* (2013.01); *H04L 67/10* (2013.01); *H04L 67/42* (2013.01); *H04L 67/20* (2013.01)

(58) Field of Classification Search
CPC .. G06F 3/0482; G06F 3/04817; G06F 3/0486; G06Q 10/063; H04L 67/10; H04L 67/20; H04L 67/02
See application file for complete search history.

(56) References Cited

U.S. PATENT DOCUMENTS

| | | | |
|---|---|---|---|
| 6,437,780 B1 * | 8/2002 | Baltaretu | ................ G06T 11/40 |
| | | | 345/423 |
| 7,194,680 B1 * | 3/2007 | Roy | ...................... G06F 17/243 |
| | | | 715/205 |
| 7,376,907 B2 * | 5/2008 | Santoro | ................. G06F 3/0481 |
| | | | 715/729 |
| 7,577,923 B2 * | 8/2009 | Beam | .................... G06F 3/0481 |
| | | | 715/810 |

(Continued)

OTHER PUBLICATIONS

Pearson Education, "Sams Teach Yourself HTML, CSS & JavaScript Web Publishing in One Hour a Day", 2016, Pearson Education, Inc., Seventh Edition.*

*Primary Examiner* — Irete F Ehichioya
*Assistant Examiner* — Huen Wong
(74) *Attorney, Agent, or Firm* — Kraguljac Law Group, LLC

(57) ABSTRACT

A system, apparatus and method for generating or modifying a display of objects using a "drag and drop" metaphor and coupling that to the processing of data records in a database. This results in a modification of the underlying records as needed to reflect the changes to the arrangement or ordering of content representing a set of objects.

17 Claims, 15 Drawing Sheets

(56) References Cited

U.S. PATENT DOCUMENTS

| | | | | |
|---|---|---|---|---|
| 7,769,794 | B2* | 8/2010 | Moore | G06F 16/168 |
| | | | | 707/831 |
| 7,777,648 | B2* | 8/2010 | Smith | G06Q 30/02 |
| | | | | 340/995.1 |
| 7,987,431 | B2* | 7/2011 | Santoro | G06F 3/0481 |
| | | | | 715/765 |
| 8,572,083 | B1* | 10/2013 | Snell | G06F 16/287 |
| | | | | 707/736 |
| 9,817,991 | B2 | 11/2017 | Boncha et al. | |
| 9,892,467 | B2 | 2/2018 | Shak et al. | |
| 2004/0203639 | A1* | 10/2004 | Ozer | H04N 5/44543 |
| | | | | 455/414.1 |
| 2005/0028079 | A1* | 2/2005 | Dinh | G06Q 10/10 |
| | | | | 715/234 |
| 2006/0047649 | A1* | 3/2006 | Liang | G06F 16/338 |
| 2006/0230083 | A1* | 10/2006 | Allyn | G06F 11/3684 |
| 2007/0162953 | A1* | 7/2007 | Bolliger | G06F 16/4393 |
| | | | | 725/142 |
| 2008/0120538 | A1* | 5/2008 | Kurz | G06F 16/9577 |
| | | | | 715/255 |
| 2009/0030891 | A1* | 1/2009 | Skubacz | G06F 16/986 |
| 2010/0088636 | A1* | 4/2010 | Yerkes | G06F 16/275 |
| | | | | 715/809 |
| 2012/0162266 | A1* | 6/2012 | Douglas | G06F 3/0481 |
| | | | | 345/677 |
| 2013/0067391 | A1* | 3/2013 | Pittappilly | G06F 3/0488 |
| | | | | 715/784 |
| 2013/0227476 | A1* | 8/2013 | Frey | G06F 3/0488 |
| | | | | 715/810 |
| 2014/0049692 | A1* | 2/2014 | Sirpal | G06F 3/017 |
| | | | | 348/569 |
| 2016/0042075 | A1* | 2/2016 | Brett | G06F 16/9535 |
| | | | | 707/754 |
| 2016/0127683 | A1* | 5/2016 | Hanson | H04L 12/1813 |
| | | | | 348/14.08 |
| 2017/0200018 | A1 | 7/2017 | Boncha et al. | |
| 2017/0236084 | A1 | 8/2017 | Sullivan et al. | |
| 2017/0236152 | A1 | 8/2017 | Dimaunahan et al. | |
| 2017/0318083 | A1* | 11/2017 | Ignatyev | H04L 67/1023 |
| 2018/0121029 | A1* | 5/2018 | Mrad | G06F 3/0605 |

* cited by examiner

From Figure 11(a)

Merchant may select and drag one or more tiles and drop them at a desired new location in the grid   1122

The system updates the bucket assignments on the client side where all the arrangement modifications are stored.   1124

Save the modifications. Send the client-side representation of the bucket-assignments to the database/server.   1126

SYSTEM AND METHODS FOR IMPLEMENTING VISUAL INTERFACE FOR USE IN SORTING AND ORGANIZING RECORDS

CROSS REFERENCE TO RELATED APPLICATION

This application claims the benefit of U.S. Provisional Application No. 62/106,321, entitled "System and Methods for Implementing Visual Interface for Use in Sorting and Organizing Records," filed Jan. 22, 2015, which is incorporated by reference in its entirety herein for all purposes.

BACKGROUND

The sorting and classification of data records is a basic operation that has uses in many different types of applications and systems. Sorting and classification can be used to identify trends, order or reorder a list of data, present information in a desired format based on one or more characteristics, assist in identifying trends or events of interest, etc. However, even though of great use, implementing a sorting or classification operation can become quite complicated, as an effective one may depend on one or more of the type of data being operated on, the format(s) of the data, the method in which data is stored or displayed, the forms of display available, a user's understanding of, and facility with, a particular display format or paradigm, etc.

In some situations, the sorting and classification of multiple numbers of data objects based on a single or multiple parameters (such as a category or sort order) is conventionally only possible via inline editing or bulk export and re-import of data to a spreadsheet type program (or other dedicated program) that has native sorting capabilities. However, current conventional sorting mechanisms/processes are often time consuming and laborious, and have to be visually checked, often in a more native and unintuitive view than the data object view in which the sorting is desired to take place. This makes many sorting operations both inefficient and also prone to error or misunderstanding on the part of a user.

Embodiments of the invention are directed toward solving these and other problems individually and collectively.

SUMMARY

The terms "invention," "the invention," "this invention" and "the present invention" as used herein are intended to refer broadly to all of the subject matter described in this document and to the claims. Statements containing these terms should be understood not to limit the subject matter described herein or to limit the meaning or scope of the claims. Embodiments of the invention covered by this patent are defined by the claims and not by this summary. This summary is a high-level overview of various aspects of the invention and introduces some of the concepts that are further described in the Detailed Description section below. This summary is not intended to identify key, required, or essential features of the claimed subject matter, nor is it intended to be used in isolation to determine the scope of the claimed subject matter. The subject matter should be understood by reference to appropriate portions of the entire specification of this patent, to any or all drawings, and to each claim.

Embodiments of the invention are directed to a system and method for generating a user interface display (UI) based on a "drag and drop" metaphor and coupling that display to the processing of underlying data records in a database. This has as one result the modification of the underlying records as needed to reflect the changes to the arrangement or ordering of content (images, text, links, etc.) made using the UI. Note that the term "sorting" in the context of the present invention refers to the processes of sorting or/and classification of data objects (e.g., such as might occur in document "coding" applications). In some embodiments, the benefits of an implementation of the invention may include:

Faster sorting—the intuitive-based system and method provide a faster approach than conventional methods;

More accurate sorting/arrangement—as the inventive method reproduces a similar UI to the end user experience, it allows a user to sort and place objects as the end user will see them, rather than in the non-intuitive conventional record grid method; and More intuitive sorting—objects to be sorted display their key sorting criteria with symbolic, visual or graphic depiction of the quantity or quality of the parameter in order to facilitate the sort operation.

Embodiments of the inventive sorting process are designed to be applicable to any entity and to any property that would normally be updated by traditional means. Note that included herein is a description of a "wizard" process that makes the inventive approach more broadly applicable to other use cases and operational environments.

Embodiments of the inventive system and methods may utilize aspects of the drag and drop metaphor to select a set of objects for display or presentation by placing them on a grid, or by re-positioning one or more objects into a desired presentation scheme. Each object may be represented by an icon, tile, or card. Each position on (or in) the grid may be represented by a unique identifier (such as a number, alpha-numeric character, serial identifier, etc.). The unique identifiers may be subject to an inherent ordering, based on numerical and/or alphabetical order (e.g., 1, 2, 3 . . . , A, B, C . . . , 1-1, 1-2 . . . 2-1, 2-2 . . . etc.).

Further, in some use cases, the position(s) of items on a grid may be associated with an inherent order with regards to the relative significance of the items placed on the grid. For example, when a grid is represented on a page, one inherent or natural ordering is related to how text on a page is read; in this case, the top left space on a grid may be associated with the beginning or highest (or lowest) value of a characteristic of the set of items being considered, while the lower right space of the grid may be associated with the lowest (or highest) value of the characteristic. Because this "characteristic" may be a value of a data field or a function or combination of data fields that contain data associated with an object (where the object may be an item of apparel or other class/category of items being displayed), embodiments of the invention enable a presentation of multiple items in an order or arrangement suggestive of their relative value, where that "value" is determined based on evaluation of an expression that may be a function of multiple data fields.

Each icon, tile, or card may include one or more display regions for data associated with the object that is represented by the icon, tile, or image. The display regions may each display a value of a data field that is associated with the object. The data fields may be part of a data record for the object. For example, if the object is an eCommerce item, the display regions may display a value of one or more of the following: the price, the inventory level, the profit margin, the number of purchases of the item in the previous day, week, month, quarter, the estimated delivery day if ordered within 24 hours, etc.

In some embodiments, the one or more of the displays of the data fields may be updated, revised, or generated based on a function of the data values of an underlying database. The database may contain ERP, CRM, eCommerce, financial, or HR data, among other types. The database may be used as part of implementing and operating a single tenant or multi-tenant business data processing platform or system. In such a case, one or more of the data display regions may present a metric corresponding to an operational aspect of a business, where the metric results from performing a calculation on, or processing of, the underlying data in the database (and/or accessing a result of applying a business related data processing application to the data).

As mentioned, in some embodiments, the icons, tiles, or cards may be positioned on the grid by an automated process, in an order corresponding to the numerical value of a function that is expressed as a combination of values from the data fields (as connected if desired by logical and/or Boolean operators). The numerical value associated with an object as determined by evaluating the specified function or combination may be ordered either greatest to least or least to greatest, and then placed in an appropriate place on the grid. The function may represent a sorting operation where the result of the sorting operation is a placement of in a resulting order. The order may be displayed to the user as a set of icons, tiles, or cards, with each positioned in a region of the display, such as an element of a grid. Each element or space on the grid is associated with a unique identifier.

A user may apply a drag and drop metaphor to rearrange the order of the displayed icons, tiles or cards. If the position of an element is altered by the user, then the identifier for the object is altered to reflect that the object is now in a space having a different address/identifier than before. This use of the identifier and its association with an object enables embodiments of the inventive system and methods to generate an initial display of a set of objects, permit a user to rearrange the objects into a desired position on a grid for presentation to a user as a page, store a revised association of the objects with an identifier for the current arrangement of the objects, permit a form of hierarchical sorting (i.e., performing and displaying results of a sort operation as a set of nested or independent outputs based on a category), and maintaining an order of presentation of the objects in a manner which is capable of being independent of the data that characterizes the objects. This permits maintaining a desired arrangement/display of multiple objects while updating data associated with those objects, such as in the display regions.

As mentioned, the placement on the grid can be used to create the inference of a natural order of the "value" of each object. Note that there is an inherent order to how a page is understood and parsed while reading text. This from the top left corner of the grid across a row, starting at the left side of the next row, across the second row . . . until the bottom right corner of the grid. This also places the text or other elements (such as icons, tiles or cards) into an order, each position of which can be associated with a number. This enables the objects to be interpreted as a string of values in numerical order of greatest value to least or least value to greatest. The value can be based on evaluation of a function of data values and/or the placement by a user.

In other embodiments, an initial sort or selection process may be performed based on inputs provided by a user, and then the user may use aspects of the drag and drop metaphor to arrange the icons, tiles, or cards into a desired set of positions. This may be used to enable a merchant to place the icons, tiles, or cards in a desired arrangement or presentation order for a shopper.

In one embodiment, the invention is directed to a method for generating a user interface display, where the method includes:
receiving inputs from a user that operate to identify a set of objects;
receiving inputs from the user that operate to identify one or more data fields that are contained in a data record associated with each object of the set of objects and that the user wishes displayed on a tile or card representing the object;
generating a visual display of each object in the set of objects as a tile or card in a region of the display;
receiving inputs from the user that operate to select, move, and indicate a new position or location for one or more of the tiles or cards; and
creating or updating a data field in the data record associated with one or more of the objects, the data field containing a unique identifier for the position of each tile or card displayed on the visual display.

In another embodiment, the invention is directed to an apparatus, where the apparatus includes:
an electronic data processing element;
a set of instructions stored on a non-transient medium and executable by the electronic data processing element, which when executed cause the apparatus to
receive inputs from a user that operate to identify a set of objects;
receive inputs from the user that operate to identify one or more data fields that are contained in a data record associated with each object of the set of objects and that the user wishes displayed on a tile or card representing the object;
generate a visual display of each object in the set of objects as a tile or card in a region of the display;
receive inputs from the user that operate to select, move, and indicate the new position or location for one or more of the tiles or cards; and
create or update a data field in the data record associated with one or more of the objects, the data field containing a unique identifier for the position of each tile or card displayed on the visual display.

In yet another embodiment, the invention is directed to a multi-tenant data processing system, where the system includes:
an electronic data processing element;
one or more business related data processing applications installed in the system and accessible by a plurality of tenants of the multi-tenant data processing system;
a data storage element accessible by a plurality of tenants of the multi-tenant data processing system;
a set of instructions stored on a non-transient medium and executable by the electronic data processing element, which when executed cause the system to
receive inputs from a user that operate to identify a set of objects;
receive inputs from the user that operate to identify one or more data fields that are contained in a data record associated with each object of the set of objects and stored in the data storage element, and that the user wishes displayed on a tile or card representing the object;

generate a visual display of each object in the set of objects as a tile or card in a region of the display, where each region is a space or element of a grid;

receive inputs from the user that operate to select, move, and indicate a new position or location for one or more of the tiles or cards; and create or update a data field in the data record associated with one or more of the objects, the data field containing a unique identifier for the position of each tile or card displayed on the visual display.

Other objects and advantages of the present invention will be apparent to one of ordinary skill in the art upon review of the detailed description of the present invention and the included figures.

BRIEF DESCRIPTION OF THE DRAWINGS

Embodiments of the invention in accordance with the present disclosure will be described with reference to the drawings, in which:

FIGS. 5(b) through 8 are diagrams illustrating example uses of the inventive sorting interface and processes. FIG. 5(b) illustrates how a user might identify or define what the unit or element will be that is subject to the user's drag and drop operations, FIG. 6 illustrates dragging a set of wines into classification buckets (varietal, vintage etc.), FIG. 7 illustrates the assignment of a sales lead to a sales representative, while FIG. 8 illustrates the placement of items into a category;

Note that the same numbers are used throughout the disclosure and figures to reference like components and features.

DETAILED DESCRIPTION

Figure 1:
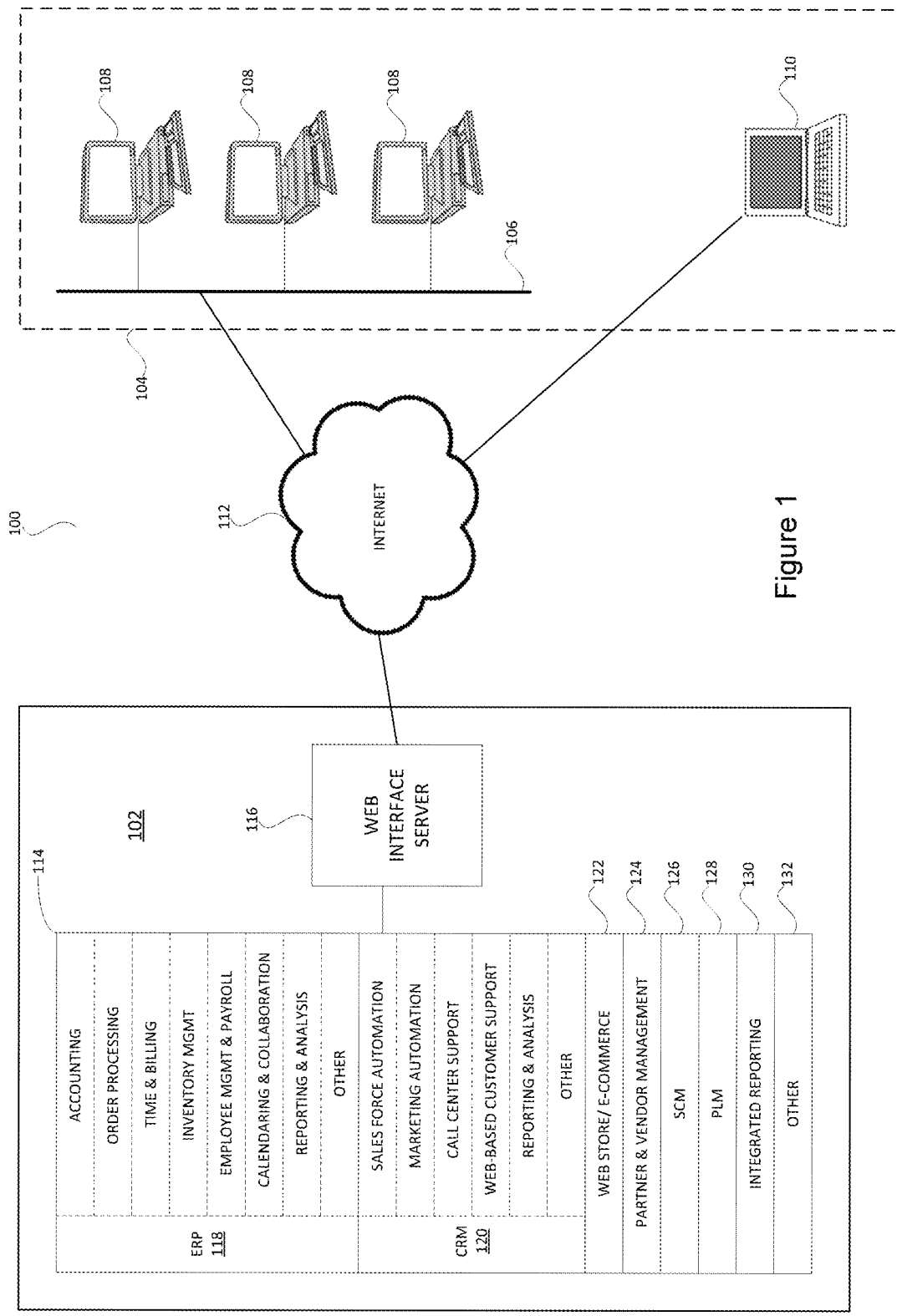
FIG. 1 is a diagram illustrating a system 100, including an integrated business system 102 and an enterprise network 104 in which an embodiment of the invention may be implemented.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention will be described more fully hereinafter with reference to the accompanying drawings, which form a part hereof, and which show, by way of illustration, exemplary embodiments by which the invention may be practiced. This invention may, however, be embodied in many different forms and should not be construed as limited to the embodiments set forth herein; rather, these embodiments are provided so that this disclosure will satisfy the statutory requirements and convey the scope of the invention to those skilled in the art.

Among other things, the present invention may be embodied in whole or in part as a system, as one or more methods, or as one or more devices. Embodiments of the invention may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, controller, etc.) that are part of a client device, server, network element, or other form of computing or data processing device/platform and that are programmed with a set of executable instructions (e.g., software instructions), where the instructions may be stored in a suitable data storage element or program module. In some embodiments, one or more of the operations, functions, processes, or methods described herein may be implemented by a specialized form of hardware, such as a programmable gate array, application specific integrated circuit (ASIC), or the like. The following detailed description is, therefore, not to be taken in a limiting sense.

Prior to describing one or more embodiments of the inventive system and methods in greater detail, note that following terms, concepts, or expressions have at least the indicated meanings (but are not to be interpreted as being limited to the indicated meanings) when referred to in the context of the invention:

Sorting—a specific sequencing of objects in either ascending or descending order based on a field value (or combination of field values). A field may be either numerically or alphabetically sorted. Typically, executing a sorting operation would re-order the entire set of items being considered;

Ordering—a specific sequencing of objects to be rendered on the UI. Typically, "ordering" may include placement of an object in a sequence, with the relative position in that sequence being determined by the evaluation of a function, expression, operation, etc. Note that the use of Drag-And-Drop metaphor allows for any such combination or arrangement to be applied to a set of objects; Note that a sorting operation may be multi-level, and based on using different parameters as the basis for the sorting operation (e.g., first sort by Price, then by Color and so on). However, ordering may arrange the items in an almost random order, as it may be based on one or more factors and on one or more operations that use those factors. For example, a first set of 10 items/records may be ordered based on the default sort (Price followed by Color), with the next set of items/records being ordered based on what is selected from the first set in real-time by a shopper. If the item picked in the first set is a "parent" item (e.g., a laptop $750 & White), then the second (child) set may present only white laptop accessories of different prices, based on popularity or what is identified by the merchant. The order of presentation of the accessories may be defined/driven either by the merchant (such as by the popularity of each accessory as purchased in the past by other shoppers).

Figure 9:
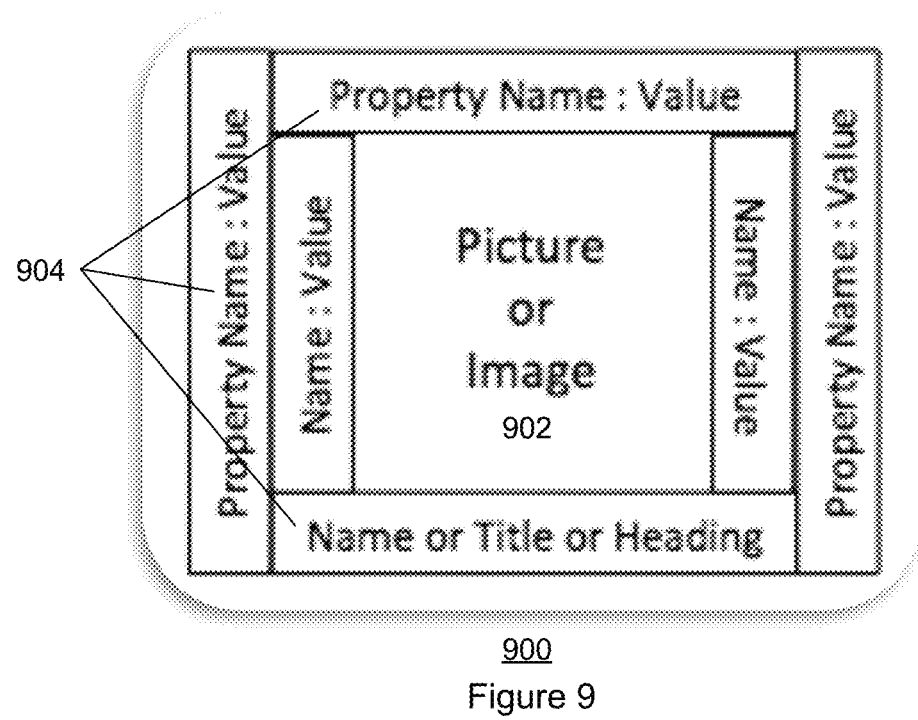
FIG. 9 is a diagram illustrating an example of a tile, icon, or card that may be used as part of implementing an embodiment of the inventive system and methods.

Item—an ecommerce Item record representing a product or service that is being offered for sale through an eCommerce marketplace or web-site;

Object—a high-level abstraction representing entities such as an item for sale;

Tile, Icon, or Card—a manifestation of an object record as presented on a user interface. FIG. 9 illustrates an example of a typical Tile that is constructed using 6 properties and an image at the center;

Bucket, Card Space or Container—a placeholder for a Tile, Icon or Card;

Source Bucket—a placeholder from where a Tile is selected/dragged out;

Destination Bucket—the receiving placeholder where the selected Tile is dropped;

Grid—the space where the objects are to be placed/arranged on the UI;

Record—a collection of data associated with a specific object (as in an object's data record or file);

Merchant—In the eCommerce example, a user/administrator who manages and configures an online store;

Shopper—In the eCommerce example, a user who desires to make purchases in an online store;

Pile of Tiles—a UI representation of a collection of Tiles from which a merchant/user may select a desired tile.

Embodiments of the invention are directed to a system and method for generating a user interface display (UI) based on a "drag and drop" metaphor and coupling that display to the processing of underlying data records in a database. This has as one result the modification of the underlying records as needed to reflect the changes to the arrangement or ordering of content (images, text, links, icons, etc.) made using the UI. Embodiments of the inventive system and methods may be applied in the context of many forms of systems that utilize a database or other data storage medium for storing records, files, etc. that correspond to the objects being sorted and displayed.

Given the desire for a configurable display and presentation of items based on multiple sort characteristics, an embodiment of the invention may operate to divide the available user interface space into a sectioned or grid display where items may be placed. In one embodiment, the grid divides the user interface into equal squares. Note that the number of "cards" on a sorting/ordering page may change based on the resolution of the user interface display (i.e., it may adapt to the available space on a given user interface, such as browsers on a computer monitor, a mobile device such as a tablet computer, a smart phone, etc.). When the number of cards exceeds the number that can be displayed on a single page/UI, the system will typically automatically paginate the display.

Using the inventive paradigm, the sorting/ordering is based on establishing a 1:1 relationship between an Object (e.g., an item, employee, contact, etc.) and the card identifier (1-1, 1-2, 1-3, . . . ). This relationship allows for 'n' different combinations of ordering possibilities, where "i" is the number of objects (e.g., eCommerce items, employee records or other data records, etc.) and "i" is much less than "n", which a function of the factorial of "i". This use of a card identifier makes the order independent (if desired) of the characteristics of the object represented by the tile.

Embodiments of the inventive system and methods may utilize aspects of the drag and drop metaphor to enable a user to select a set of objects for display or presentation by placing them on a grid. Each object may be represented by an icon, tile, or card. Each position on (or in) the grid may be represented by a unique identifier (such as a number, alphanumeric character, serial identifier, etc.). The unique identifiers may be subject to an inherent ordering, based on numerical and/or alphabetical order.

Further, in some use cases, the position(s) of items on a grid may be associated with an inherent (or typically recognized) order with regards to the relative significance or value of the items placed on the grid. For example, when a grid is represented on a page, one type of ordering is related to how text on a page is read; in this case, the top left space on a grid may be associated with the beginning or highest (or lowest) value of a characteristic of the set of items being considered, while the lower right space of the grid may be associated with the lowest (or highest) value of the characteristic. Because this "characteristic" may be a value of a data field or a combination of data fields that contain data associated with an object, embodiments of the invention enable a presentation of multiple items in an order or arrangement suggestive of their relative value, where that "value" is determined based on evaluation of an expression that may be a function of multiple data field values.

For example, a merchant may define an expression that is a weighted combination of several factors, where each factor corresponds to data that is associated with an object (e.g., profit margin, sales velocity, remaining inventory, etc.). Further, each weight and/or factor may be dynamic and vary in accordance with the operation of the merchant's business. The real-time or pseudo real-time value or values of the factors may be obtained from an underlying database, such as may be used in implementing a single or multi-tenant business data processing platform.

Each icon, tile, or card may include one or more display regions for data associated with the object that is represented by the icon, tile, or card. The display regions may each display a value of a data field that is associated with the object. The data fields may be part of a data record associated with the object. For example, if the object is an eCommerce item, the display regions may display a value of one or more of the following: the price, the inventory level, the profit margin, the number of purchases of the item in the previous day, week, month, quarter, the estimated delivery day if ordered within 24 hours, etc.

In some embodiments, the one or more of the displays of the data fields may be updated, revised, or generated based on a function of the data values of an underlying database. The database may contain ERP, CRM, eCommerce, financial, or HR data, among other types. The database may be used as part of implementing and operating a multi-tenant business data processing platform or system.

As mentioned, in some embodiments, the icons, tiles, or cards may be positioned on the grid by an automated process, in an order corresponding to the numerical value of a function that is expressed as a combination of values from the data fields (as connected if desired by logical and/or Boolean operators). In one embodiment, the numerical value associated with an object as determined by evaluating the specified function or combination may be ordered either greatest to least or least to greatest, and then placed in an appropriate place on the grid.

An embodiment of the inventive system and methods may therefore be used to perform one or more of:
  select and position the members of a set or class of objects on a grid (such as a group of shoes, shirts, jackets, radios, computers, videos, etc.);
  associate the position of each member of the class of objects with a grid space identifier, and associate that identifier to the data record or file for the object/member;
  determine a value of a function of one or more data fields/characteristics associated with each object, and if desired, place the objects on the grid in an order reflective of the value of the function;
    with the placement based on an ordering of that value from greatest to least or least to greatest, and arranged with the first object (the one having the greatest or least value of the function) in the upper left most grid location, and the last object (the one having the least or greatest value of the function) in the lower right most grid location;
  update, revise, or otherwise alter a display of a data value of a data field that is part of an icon, tile, card or image for an object, with that updating, revising, etc. being performed so as to reflect a value for that data field as stored in an underlying database;
    where the data field that is associated with an object may be populated by an ERP, CRM, eCommerce, HR, financial, or other type of business data processing application.

In some embodiments, the invention may be implemented in the context of a multi-tenant, "cloud" based environment (such as a multi-tenant business data processing platform), typically used to develop and provide web services for end users. This exemplary implementation environment will be described with reference to FIGS. 1-3. Note that embodiments of the invention may also be implemented in the context of other computing or operational environments or systems, such as for an individual business data processing system, a private network used with a plurality of client terminals, a terminal communicating with a central database, a remote or on-site data processing system, another form of client-server architecture, etc.

In such a multi-tenant "cloud" based environment, data maintained in a database may be the subject of sorting, organizing, or filtering operations, with those operations based on multiple possible criteria, combinations of criteria, and specified logical, mathematical or other operations. The sorting, organizing, or filtering operations may be used to generate reports, provide a set of data for further analysis, generate a display or dashboard for viewing by a manager or decision maker, etc.

Embodiments of the inventive system and methods permit a tenant user/account of a multi-tenant business data processing system or platform to modify the manner in which data objects are identified in the database in response to the user's usage of one or more aspects of the drag and drop metaphor based UI. The data modifications may include ones to the address, location, metadata, or other aspect of the data object or objects that were the subject of the user's UI inputs. These data modifications enable applications that access, process, and report the data stored in the database (such as ERP, CRM, HR, Business Intelligence, financial, or eCommerce data) to more accurately utilize the stored data for purposes of generating metrics, displays, dashboards, and enabling users to better understand the operations of a business.

Note that although one or more embodiments of the inventive system and methods may be described with reference to their implementation within a multi-tenant data processing system or platform, the system and methods may also be implemented as part of a web server or other form of server platform that hosts data and information for a single tenant. Further, although one or more embodiments of the inventive system and methods may be described with reference to their implementation as part of a sorting or ordering process for use within an eCommerce application, the system and methods may also be implemented as part of a product design system, computer-aided design tool, data management tool, etc.

Modern computer networks incorporate layers of virtualization so that physically remote computers and computer components can be allocated to a particular task and then reallocated when the task is done. Users sometimes speak in terms of computing "clouds" because of the way groups of computers and computing components can form and split responsive to user demand, and because users often never see the computing hardware that ultimately provides the computing services. More recently, different types of computing clouds and cloud services have begun emerging.

For the purposes of this description, cloud services may be divided broadly into "low level" services and "high level" services. Low level cloud services (sometimes called "raw" or "commodity" services) typically provide little more than virtual versions of a newly purchased physical computer system: virtual disk storage space, virtual processing power, an operating system, and perhaps a database such as an RDBMS. In contrast, high or higher level cloud services typically focus on one or more well-defined end user applications, such as business oriented applications. Some high level cloud services provide an ability to customize and/or extend the functionality of one or more of the end user applications they provide; however, high level cloud services typically do not provide direct access to low level computing functions.

The ability of business users to access crucial business information has been greatly enhanced by the proliferation of IP-based networking together with advances in object oriented Web-based programming and browser technology. Using these advances, systems have been developed that permit web-based access to business information systems, thereby allowing a user with a browser and an Internet or intranet connection to view, enter, or modify business information. For example, substantial efforts have been directed to Enterprise Resource Planning (ERP) systems that integrate the capabilities of several historically separate business computing systems into a common system, with a view toward streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions.

In a related development, substantial efforts have also been directed to integrated Customer Relationship Management (CRM) systems, with a view toward obtaining a better understanding of customers, enhancing service to existing customers, and acquiring new and profitable customers. By way of example, the capabilities or modules of a CRM system can include (but are not required to include, nor limited to only including): sales force automation (SFA), marketing program automation, contact list, call center support, returns management authorization (RMA), loyalty program support, and web-based customer support, as well as reporting and analysis capabilities relating to these functions. With differing levels of overlap with ERP/CRM initiatives and with each other, efforts have also been directed toward development of increasingly integrated partner and vendor management systems, as well as web store/eCommerce, product lifecycle management (PLM), and supply chain management (SCM) functionality.

FIG. 1 is a diagram illustrating a system 100, including an integrated business system 102 and an enterprise network 104 in which an embodiment of the invention may be implemented. Enterprise network 104 may be associated with a business enterprise, such as a retailer, merchant, service provider, or other type of business. Alternatively, and in accordance with the advantages of an application service provider (ASP) hosted integrated business system (such as a multi-tenant data processing platform), the business enterprise may comprise fewer or no dedicated facilities or business network at all, provided that its end users have access to an internet browser and an internet connection. For simplicity and clarity of explanation, the enterprise network 104 is represented by an on-site local area network 106 to which a plurality of personal computers 108 are connected, each generally dedicated to a particular end user (although such dedication is not required), along with an exemplary remote user computer 110 that can be, for example, a laptop computer or tablet computer of a traveling employee having internet access through a hotel, coffee shop, a public Wi-Fi access point, or other internet access method. The end users associated with computers 108 and 110 may also (or instead) possess an internet-enabled smartphone or other electronic device (such as a PDA, tablet, or other form of mobile computing and/or communications device) having wireless internet access or other synchronization capabilities. Users of the enterprise network 104 interface with the integrated business system 102 across the Internet 112 or another suitable communications network or combination of networks.

Integrated business system 102, which may be hosted by a dedicated third party, may include an integrated business server 114 and a web interface server 116, coupled as shown in FIG. 1. It is to be appreciated that either or both of the integrated business server 114 and the web interface server 116 may be implemented on one or more different hardware systems and components, even though represented as singular units in FIG. 1. In one embodiment, integrated business server 114 comprises an ERP module 118 and further comprises a CRM module 120. In many cases, it will be desirable for the ERP module 118 to share methods, libraries, databases, subroutines, variables, etc., with CRM module 120, and indeed ERP module 118 may be intertwined with CRM module 120 into an integrated Business Data Processing Platform (which may be single tenant, but is typically multi-tenant).

The ERP module 118 may include, but is not limited to, a finance and accounting module, an order processing module, a time and billing module, an inventory management and distribution module, an employee management and payroll module, a calendaring and collaboration module, a reporting and analysis module, and other ERP-related modules. The CRM module 120 may include, but is not limited to, a sales force automation (SFA) module, a marketing automation module, a contact list module (not shown), a call center support module, a web-based customer support module, a reporting and analysis module, and other CRM-related modules. The integrated business server 114 (or multi-tenant data processing platform) further may provide other business functionalities including a web store/eCommerce module 122, a partner and vendor management module 124, and an integrated reporting module 130. An SCM (supply chain management) module 126 and PLM (product lifecycle management) module 128 may also be provided. Web interface server 116 is configured and adapted to interface with the integrated business server 114 to provide one or more web-based user interfaces to end users of the enterprise network 104.

The integrated business system shown in FIG. 1 may be hosted on a distributed computing system made up of at least one, but likely multiple, "servers." A server is a physical computer dedicated to run one or more software services intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service that a server offers it could be referred to as a database server, file server, mail server, print server, web server, etc. A web server is a combination of hardware and the software that helps deliver content, commonly by hosting a website, to client web browsers that access the web server via the Internet.

Figure 2:
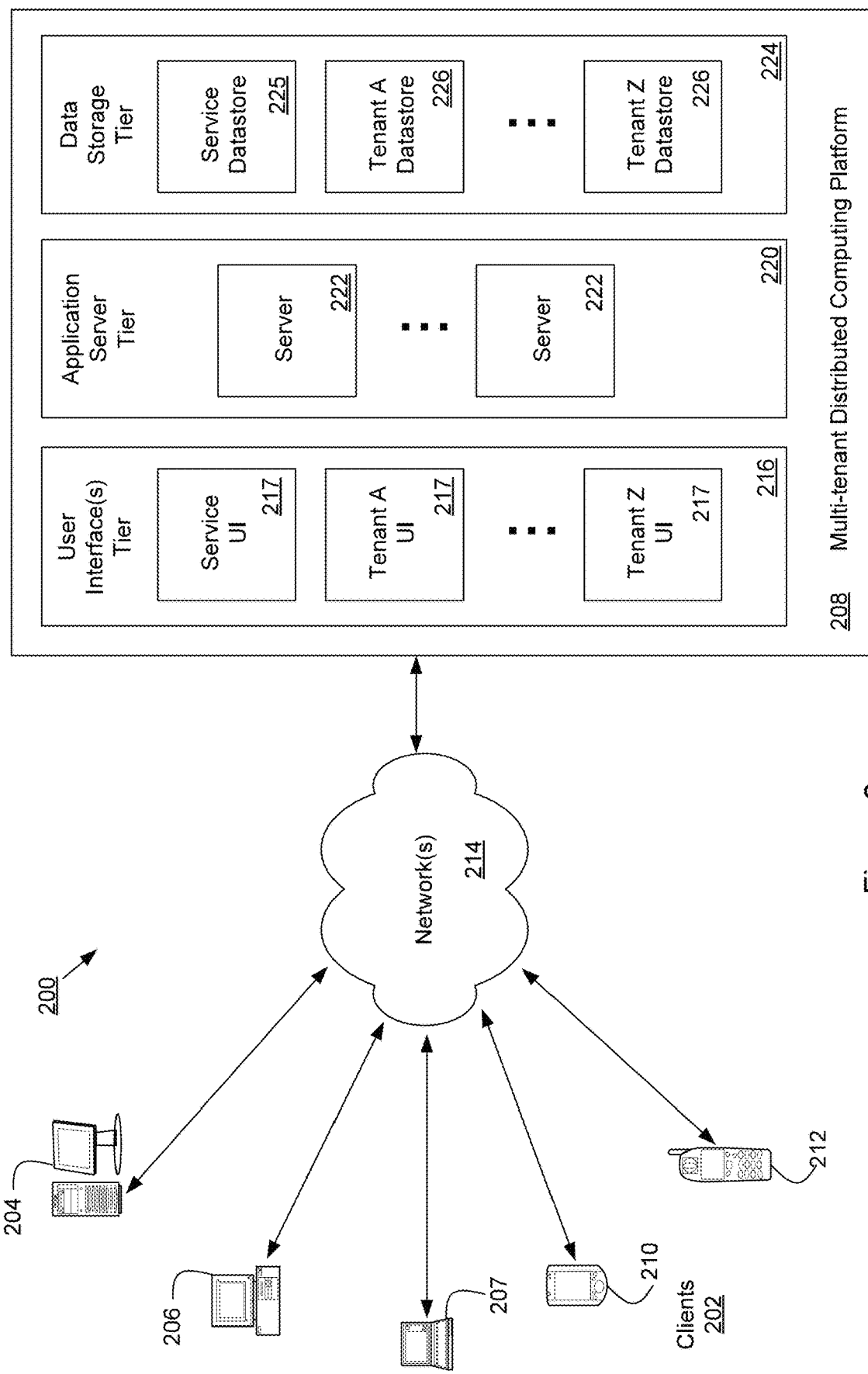
FIG. 2 is a diagram illustrating elements or components of an example operating environment 200 in which an embodiment of the invention may be implemented.

FIG. 2 is a diagram illustrating elements or components of an example operating environment 200 in which an embodiment of the invention may be implemented. As shown, a variety of clients 202 incorporating and/or incorporated into a variety of computing devices may communicate with a distributed computing service/platform 208 through one or more networks 214. For example, a client may incorporate and/or be incorporated into a client application (e.g., software) implemented at least in part by one or more of the computing devices. Examples of suitable computing devices include personal computers, server computers 204, desktop computers 206, laptop computers 207, notebook computers, tablet computers or personal digital assistants (PDAs) 210, smart phones 212, cell phones, and consumer electronic devices incorporating one or more computing device components, such as one or more electronic processors, microprocessors, central processing units (CPU), or controllers. Examples of suitable networks 214 include networks utilizing wired and/or wireless communication technologies and networks operating in accordance with any suitable networking and/or communication protocol (e.g., the Internet).

The distributed computing service/platform (which may also be referred to as a multi-tenant business data processing platform) 208 may include multiple processing tiers, including a user interface tier 216, an application server tier 220, and a data storage tier 224. The user interface tier 216 may maintain multiple user interfaces 217, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs). The default user interface may include components enabling a tenant to administer the tenant's participation in the functions and capabilities provided by the service platform, such as accessing data, causing the execution of specific data processing operations, etc. Each processing tier shown in the figure may be implemented with a set of computers and/or computer components including computer servers and processors, and may perform various functions, methods, processes, or operations as determined by the execution of a software application or set of instructions. The data storage tier 224 may include one or more data stores, which may include a Service Data store 225 and one or more Tenant Data stores 226.

Each tenant data store 226 may contain tenant-specific data that is used as part of providing a range of tenant-specific business services or functions, including but not limited to ERP, CRM, eCommerce, Human Resources management, payroll, etc. Data stores may be implemented with any suitable data storage technology, including structured query language (SQL) based relational database management systems (RDBMS).

In accordance with one embodiment of the invention, distributed computing service/platform 208 may be multi-tenant and service platform 208 may be operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an Enterprise Resource Planning (ERP) system that integrates the capabilities of several historically separate business computing systems into a common system, with the intention of streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions. Another business information system that may be provided as part of an integrated data processing and service platform is an integrated Customer Relationship Management (CRM) system, which is designed to assist in obtaining a better understanding of customers, enhance service to existing customers, and assist in acquiring new and profitable customers. By way of example, the capabilities or modules of a CRM system can include (but are not required to include, nor limited to only including): sales force automation (SFA), marketing program automation, contact list, call center support, returns management authorization (RMA), loyalty program support, and web-based customer support, as well as reporting and analysis capabilities relating to these functions. In addition to ERP and CRM functions, a business information system/platform (such as element 208 of FIG. 2) may also include one or more of an integrated partner and vendor management system, eCommerce system (e.g., a virtual storefront application or platform), product lifecycle management (PLM) system, Human Resources management system (which may include medical/dental insurance administration, payroll, etc.), or supply chain management (SCM) system.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform.

The integrated business system shown in FIG. 2 may be hosted on a distributed computing system made up of at least one, but typically multiple, "servers." A server is a physical computer dedicated to run one or more software services intended to serve the needs of the users of other computers in data communication with the server, for instance via a public network such as the Internet or a private "intranet" network. The server, and the services it provides, may be referred to as the "host" and the remote computers and the software applications running on the remote computers may be referred to as the "clients." Depending on the computing service that a server offers it could be referred to as a database server, file server, mail server, print server, web server, etc. A web server is a combination of hardware and the software that helps deliver content (typically by hosting a website) to client web browsers that access the web server via the Internet.

Rather than build and maintain such an integrated business system themselves, a business may utilize systems provided by a third party. Such a third party (i.e., a platform operator, manager, or administrator) may implement an integrated business system/platform as described above in the context of a multi-tenant platform, wherein individual instantiations of a single comprehensive integrated business system are provided to a variety of tenants. One advantage to such multi-tenant platforms is the ability for each tenant to customize their instantiation of the integrated business system to that tenant's specific business needs or operational methods. Each tenant may be a business or entity that uses the multi-tenant platform to provide business data and functionality to multiple users, including customers and employees. Some of those multiple users may have distinct roles or responsibilities within the business or entity. As a result, such users may have a need or preference to utilize certain components of a user interface or other functional aspects of the computing/data processing platform when performing their functions.

In some cases, a tenant may desire to modify or supplement the functionality of an existing platform application by introducing an extension to that application, where the extension is to be made available to the tenant's employees and/or customers. In some cases, such an extension may be applied to the processing of one or more types of the tenant's business related data that is resident on the platform. The extension may be developed by the tenant or by a 3rd party developer and then made available to the tenant for installation. The platform may include a "library" or catalog of available extensions, which can be accessed by a tenant and searched to identify an extension of interest. Software developers may be permitted to "publish" an extension to the library or catalog after appropriate validation of a proposed extension.

Thus, in an effort to permit tenants to obtain the services and functionality that they desire (which may include providing certain services to their end customers, such as in the case of an eCommerce platform), a multi-tenant service platform may permit a tenant to configure certain aspects of the available service(s) to better suit their business needs. In this way aspects of the service platform may be customizable, and thereby enable a tenant to configure aspects of the platform to provide distinctive services to their respective users or to groups of those users. For example, a business enterprise that uses the service platform may want to provide additional functions or capabilities to their employees and/or customers, or cause their business data to be processed in a specific way in accordance with a defined workflow that is tailored to their business needs, etc.

Tenant customizations to the platform may include custom functionality (such as the capability to perform tenant or user-specific functions, data processing, or operations) built on top of lower level operating system functions. Some multi-tenant service platforms may offer the ability to customize functions or operations at a number of different levels of the service platform, from aesthetic modifications to a graphical user interface to providing integration of components and/or entire applications developed by independent third party vendors. This can be very beneficial, since by permitting use of components and/or applications developed by third party vendors, a multi-tenant service can significantly enhance the functionality available to tenants and increase tenant satisfaction with the platform.

As noted, in addition to user customizations, an independent software developer may create an extension to a particular application that is available to users through a multi-tenant data processing platform. The extension may add new functionality or capabilities to the underlying application. One or more tenants/users of the platform may wish to add the extension to the underlying application in order to be able to utilize the enhancements to the application that are made possible by the extension.

Figure 3:
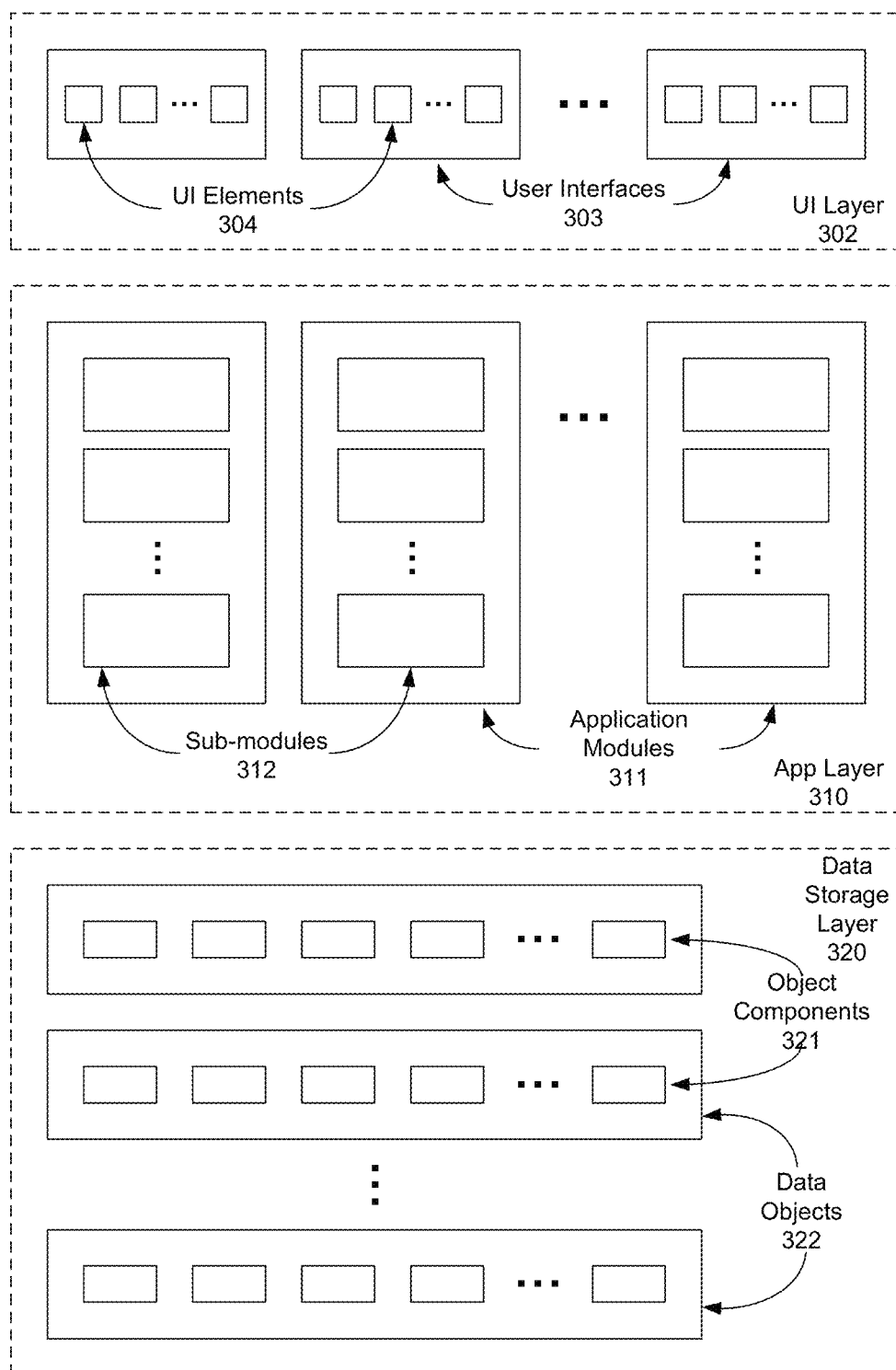
FIG. 3 is a diagram illustrating additional details of the elements or components of the multi-tenant distributed computing service platform of FIG. 2, in which an embodiment of the invention may be implemented.

FIG. 3 is a diagram illustrating additional details of the elements or components of the multi-tenant distributed computing service platform of FIG. 2, in which an embodiment of the invention may be implemented. The software architecture depicted in FIG. 3 represents an example of a software system to which an embodiment of the invention may be applied, i.e., in which it may be implemented. In general, an embodiment of the invention may be implemented by a suitable set of software instructions that are designed to be executed by a suitably programmed processing element (such as a CPU, microprocessor, processor, controller, computing device, server, processing platform, etc.). In a complex system such instructions are typically arranged into "modules" with each such module performing a specific task, process, function, or operation. The entire set of modules may be controlled or coordinated in their operation by an operating system (OS) or other form of organizational platform.

As noted, FIG. 3 is a diagram illustrating additional details of the elements or components 300 of the multi-tenant distributed computing service platform of FIG. 2, in which an embodiment of the invention may be implemented. The example architecture includes a user interface layer or tier 302 having one or more user interfaces 303. Examples of such user interfaces include graphical user interfaces and application programming interfaces (APIs). Each user interface may include one or more interface elements 304. For example, users may interact with interface elements in order to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks and dialog boxes. Application programming interfaces may be local or remote, and may include interface elements such as parameterized procedure calls, programmatic objects and messaging protocols.

The application layer 310 may include one or more application modules 311, each having one or more sub-modules 312. Each application module 311 or sub-module 312 may correspond to a particular function, method, process, or operation that is implemented by the module or sub-module (such as to support or implement an ERP, CRM, eCommerce, or platform administrative feature or function). Such function, method, process, or operation may include those used to implement one or more aspects of the inventive system and methods, such as for:

Generating a user interface configured to enable a user to exercise a "drag and drop" type metaphor by selecting and moving, ordering, or arranging objects displayed to the user (where the objects may include one or more of text, an image, a link, a displayed unit or element, a file, a folder, an icon, a tile, a card, etc.);

By interpreting the user's actions or inputs to the user interface, coupling the result of the user selecting and moving, ordering, or arranging the objects using the interface to appropriate changes or modifications to identifier data stored in a database which, for a plurality of objects, includes a unique identifier for each object and a set of data associated with the object which characterize the object. The identifier may be an alphanumeric string uniquely associated with a space, location or element of a grid;

Enabling the items/objects (the individual icons, tiles, or cards) to be sorted and/or arranged based on the actions of a user and/or an evaluation of a function or expression of one or more data fields associated with each item/object;

where the one or more data fields represent characteristics of the object or item represented by the icon, tile, card, etc. The characteristics may be values of data fields that are associated with the object, and may be contained in an underlying database. The file or record for each object/item may be subjected to processing, updating, or revising by one or more business oriented data processing applications (including but not limited to ERP, CRM, eCommerce, financial, HR, etc.); and Enabling the icon, tile, or card that represents an object/item to indicate or reflect certain characteristics of the object/item; these may be presented by one or more display regions on the icon, tile, or card, where the display region(s) may present a data value associated with a characteristic of the object/item. The data value may be stored in a data field that is associated with a data record or file for the object/item. The data display region(s) may be updated in real-time, pseudo real-time, or in another manner as desired to reflect the underlying data field values associated with the object/item.

The data values displayed (or trends in the values) provide insight into the operations of the entity that generated the data and may be used as part of managing the entity. In the case of a business, the data values may be raw data representing characteristics/metrics associated with the business. These may include inventory, profit margins, sales, conversion rate, revenue, share price, employee count, etc. In addition to displaying raw data values, the display regions may display the results of processing the raw data by an ERP, CRM, HR, eCommerce, financial, or other business data processing application.

In the case of a model of a system or network, the icon, tile, or card may represent a node or decision point in a process or network. The data values associated with a node may represent operational metrics for the node and/or the result of the data processing of those operational metrics. Application of an embodiment of the inventive system and methods may enable a user to prioritize resources by indicating the relative ranking of the nodes in terms of a specific node metric or a function of such metrics.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 222 of FIG. 2) may include each application module. Alternatively, different application servers may include different sets of application modules. Such sets may be disjoint or overlapping.

The data storage layer 320 may include one or more data objects 322 each having one or more data object components 321, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

Note that the example computing environments depicted in FIGS. 1-3 are not intended to be limiting examples. Alternatively, or in addition, computing environments in which an embodiment of the invention may be implemented include any suitable system that permits users to provide data to, and access, process, and utilize data stored in a data storage element (e.g., a database) that can be accessed directly by a user or remotely over a network. Further example environments in which an embodiment of the invention may be implemented include devices, software applications, systems, processing platforms, apparatuses, or other elements or components that are used to acquire and process financial or other business related data and provide the results of that processing to users. Although further examples below may reference the example computing environment depicted in FIGS. 1-3, it will be apparent to one of skill in the art that the examples may be adapted for alternate computing devices, systems, apparatuses, processes, and environments.

In some embodiments, the inventive system and methods operate to manage/alter a "sequence #" associated with each of a plurality of items to be displayed, based on the placement of an Item on a grid. This may be accomplished automatically, and without requiring a merchant/user to manually edit a numerical value, thereby saving time and eliminating possible data entry errors. In some embodiments, an initial sequence number may be assigned based on a sort over one or more data fields (color, price, size, etc.) that are part of the object's or item's data record. Using the drag-and-drop paradigm, the merchant may move a tile, icon, or card representing the item from its original position (having an original sequence #) to a new position (having a new sequence #). In some embodiments, an item in a source bucket may either exchange its sequence # with that of an item in the destination bucket, or the sequence # for the item at the destination bucket may cause every sequence number for items thereafter to move up/down by one. If a merchant wants to move multiple items, the merchant may drag-and-drop them in a specific destination bucket/location. In this case all of the selected Items will be inserted at the new location. The selected Items will remain in the original sort order and will be assigned consecutive sequence numbers. The unmoved tiles after the destination location will have their sequence numbers shifted up/down by the total number of items moved.

Figure 4:
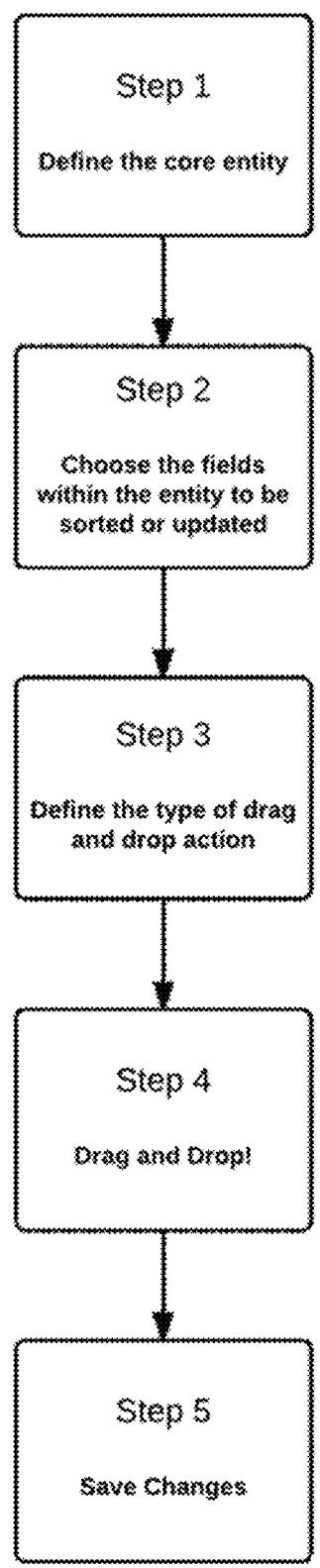
FIG. 4 is a flowchart or flow diagram illustrating an exemplary method, process, function, or operation that may be used in an implementation of an embodiment of the invention.

FIG. 4 is a flowchart or flow diagram illustrating an exemplary method, process, function, or operation that may be used in an implementation of an embodiment of the invention. A description of the stages or steps involved and their relationship to the implementation of an embodiment of the invention are contained in the following paragraphs.

As shown in the figure, an implementation of an embodiment of the inventive method may include one or more of the following steps, stages, processes, operations, or functions:

1. Define the Core Entity to be Sorted or Arranged with the Drag and Drop User Interface (UI)

This stage or step (an example of which is displayed in FIG. 5) is used to identify or define what the unit or element will be that is subject to the user's drag and drop operations. In some sense, it defines the fundamental unit that may be moved, sorted, re-arranged, etc. by the user by providing the suitable inputs, values, or operations via the user interface.

In one embodiment, the selected unit or element may be represented by a "card", tile, or icon on a display screen. The card, tile, or icon is the element that is subject to being selected, moved, rearranged, ordered, etc. by the action or actions of a user. The card, tile, or icon may be placed into a grid for ease of recognition by and interaction with the user. By use of a drag and drop interface/operation, a user may arrange the cards, tiles, or icons into one or more desirable piles, sets, categories, allocations, or groupings. These piles, sets, categories, allocations, or groupings may then be subjected to further data processing and analysis.

In some embodiments, this unit or element may be one or more of the following objects, categories, fields, subjects, characteristics, classes, types, etc. that may exist in the context of operating a business:
  a. Accounting
    i. Purchase orders
    ii. Sales orders
    iii. Payments
  b. Activities
  c. Classification
  d. Communications
    i. Phone call
    ii. Email
    iii. SMS
  e. Custom Records—any record
  f. Customization
  g. Employees
    i. Projects
    ii. Teams
    iii. Hierarchies
  h. Items
    i. Categories
    ii. Images
    iii. Sorting parameters
  i. Relationships
  j. Supply Chain
    i. Inventory allocations
    ii. Stock transfers
    iii. Purchasing
  k. Support
    i. Tickets
    ii. Prioritizations
    iii. Queue management
  l. Transactions
    i. Reconciliation
  m. Websites
    i. Content management
    ii. Content objects
  n. Tasks
    i. Allocation
  o. Projects
    i. Roles
    ii. Tasks 2. Choose the Fields within the Entity that Need to be Displayed for Purposes of Decision Making, as well as the Field(s) to be Sorted or Updated This stage or step is used to specifically indicate which fields of the selected unit or element (or category) are to be displayed on the metaphor that is presented to the user by the UI and that are manipulable by the user. This will be the actual data values that the user visualizes when selecting and re-arranging information that is contained within the entity. Note that this could also be a graphical, iconic or symbolic representation of the data values for a more intuitive sorting experience (e.g., a symbol representing the significance of a data value, or a color indicating a relative strength/level of a data value).
  a. One or more of these fields may be displayed on the sort "cards"/tiles (or other icon or metaphor for the field or fields) that is presented to the user—with regard to this aspect, note that;
    i. Field types can be color blocks, images, icons, symbols, quantitative indicators or values;
    ii. Fields that support (utilized as part of) the sort decision may be those such as sell through rate, profit margin, current values, Boolean operators, etc. A suitably configured "wizard" application or process may be used to allow the user to select any property of a record;
    iii. The selected value(s) may be displayed in a manner to assist the visual decision-making around the sort process. Color-coding may be used to indicate low or high values, for example. A line graph could show trending sales on an item over the last quarter, a bucket icon could show a percentage full, etc.; and
  b. The metaphor is capable of being manipulated by the user's sorting, ordering, or rearranging actions as caused by inputs to the UI (such as the selection, drag, and drop actions).

3. Define the Type of Drag and Drop Action to be Performed

Possible options might be:
  a. A numerical sort of the values in an integer field; here the integer step value would be rebased by the user's sort action (e.g., 1, 10, 100, etc.)
    For example:
      i. Item record sort order
        1. Sub-Sku parent-child relationships could propagate the updated properties;
      ii. Task priority order reassignment (for projects); or
      iii. Case priority order reassignment (for issue management and prioritization).
  b. List value reassignment; here the operation is to change a single property of an entity to another value. This operation allows for properties that are multi-select (in this case the item sort cards or other form of representation would remain in the originating source area or grid of the display).
    Note that in the case of single value assignments, the sorted entity would move into the target bucket/location, while in the case of multi-value assignments being permissible, the UI may allow the setting of one as a default value if this is allowable.
    As examples (but not intended to be exhaustive or limiting):
      i. Item record categorization; this moves items to categories or re-arranges items between categories—may include a way to set a default category;
      ii. Item record property assignment; this assigns a list property such as facet navigation to unclassified or partly classified items. For example (as suggested by FIG. 6), dragging a set of wines into classification buckets (varietal, vintage etc.). Other examples are the assignment of a sales lead to a sales representative (as suggested by FIG. 7) or the placement of items into a category (as suggested by FIG. 8). In the case of multiple-select values being allowable, the drag action may keep the sort card in its original position for further classification; or
      iii. Free value or new value assignment; this aspect uses un-named buckets for either temporarily "holding" sort cards or for a to-bedefined classification. For example, a new support rep or a new category (this is similar to the idea of a temporary "parking lot" for records, where the user can leave records for use as part of a later sorting action).

4. Drag and Drop—Perform Specified (or Default) Sorting Action—Provides Real-Time Display and Sort
   a. In response, the sort cards update with the changed properties in real-time within the UI display (which may be composed of one or more windows, regions, sectors, dashboards, etc.);
   b. An important aspect of the inventive sorting UI is the speed of the user experience; in one embodiment, changed values are stored in the browser UI session, thereby leveraging modern browser processing capability to deliver the sort experience and the reassigned object sort values. This provides minimal latency for the user, with any required master data updates being performed once the sorting action is complete;
   c. Changed property values may be displayed on the cards (or other sort item metaphor) after movement or rearrangement, so that the user can easily see the impact of their changes or rearrangements;
   d. Changed values may be indicated with a visual indicator such as bold, underline, or presented in a different color;
   e. Drag and drop grids are an intuitive format and provide for zooming in and out, dragging of multiple records using standard keyboard shortcuts, dragging of records to a "parking space", etc.;
   f. The user's in browser cached version of the data may be updated multiple times during a sorting process, with no committed updates back to the master data system of record; and
   g. A variety of visual metaphors for a real life sorting action could be adapted for representation by the sorting UI. For example, moving personnel images into teams.

5. Batch and Save the Changes to the Record Properties that Result from the User's Sorting, Ordering, or Rearrangement
   a. Upon completion of sorting/ordering operations by the user, a single save action saves/commits the changes to the records in the database or other data storage element;
   b. These changes could form a versioned data update feeding a data version control layer;
   c. Note that parent-child relationships will propagate the values as appropriate (if desirable, an implementation may include an option to propagate changes to child records);
   d. The UI may display a time estimate and/or show a progress indicator during the save operation; this is presented similarly to the display of a mass update;
   e. The UI should present success or failure of an operation, with itemised error reporting for records that failed to be updated; and
   f. If a version control system is in operation, then the UI should present the committed version number date and time of the changes.

In some embodiments, the invention may be implemented using the jQuery UI Touch library (as an example, but not being limited to) combined with an appropriate script to make changes to the sorted records once the user has finished sorting/arranging. Other forms of an interactive client browser framework could also (or instead) be used to provide the UI for an embodiment of the inventive system and methods.

Note that in some embodiments, and as described with reference to FIG. 4 (in steps or stages 4 and 5), as the record(s) selected by the user and being "sorted" (AAAA) are moved to their target classification category (as represented by a region/area/"bucket" and which is a value of the property being set or modified by the sort or classification action) BBBB, the newly changed property for each record is stored in the user's browser. The user may perform multiple (re)sorting/ordering/selecting operations until the user is satisfied with the AAAA to BBBB sorting/classification process and the records are ready to commit. At this point, the user can save the records with the respective changed properties to a master database. As part of the saving operation, each record that has a changed parameter (AAAA to BBBB) is committed to the database as an update to the record.

In general, when the sorting or classification operation is performed, the specific property on the record relating to the action is changed, updated, revised, or otherwise altered. For example:

for an eCommerce sorting, the "sort order" integer property may be changed and committed to the database once the drag and drop process has been completed and the records are ready to be saved; or for the example of dragging leads to sales reps, the assigned sales rep (a discrete list of values pertaining to valid sales reps for that lead) is saved once the sort is completed.

Other example use cases in which an embodiment of the inventive system and methods may provide benefits include the following, and provide the noted potential benefits or advantages:

1. Changing the display order within an eCommerce product category
   Benefits include
   Data processing results—faster, more intuitive sort possible
   Business insight/impact—more effective merchandising and selling—a positive bottom line impact;

2. Moving of eCommerce products between categories
   Benefits—as noted with reference to example (1) above;

3. Moving of project resources between projects
   Benefits include
   New functions exposed—more responsive allocation of project tasks
   Business insight/impact—improved project efficiency and resource utilization;

4. Moving of leads between sales reps
   Benefits include
   Business insight/impact—fairer or more balanced multi-dimensional allocation of leads, based on industry size, etc.;

5. Moving of inventory between locations
   Benefits include
   New functions exposed—new mechanism to expose inventory gaps or misallocations
   Data processing results—faster and less cumbersome method to produce stock transfers
   Business insight/impact—reduced time to fulfill to the customer from a multiple inventory business. Less chance of lost sales or dissatisfied customers;

6. Move orders to pick to warehouse pickers. Visually represent multiple parameters that may be used to decide fulfilment priority—such as
   # of line items
   $ order value
   # days since placed
   Benefits include
   New functions exposed—multi-dimensional sorting and prioritization
   Data processing results—faster prioritization leading to better execution
   Business insight/impact—more satisfied customers in general (and specifically, high value customers);
7. Move cases to service agents
   Business insight/impact—more satisfied customers with more efficient handling of cases;
8. Procurement/forecasting—decide which stock to re-order based on sell through and current stock
   Benefits include
   New functions exposed—multi dimensional visual prioritization tool for purchasing. Applications to improved forecasting
   Data processing results—faster and more intuitive way to prioritize purchasing
   Business insight/impact—reduced chance of out of stock—increased revenue and customer satisfaction; and
9. Move tasks between resources
   Benefits include
   New functions exposed—showing key utilization metrics on target resources—assign tasks to under-utilized resources, for example.
   Data processing results—faster re-allocation
   Business insight/impact—increase business efficiency.

Figure 5A:
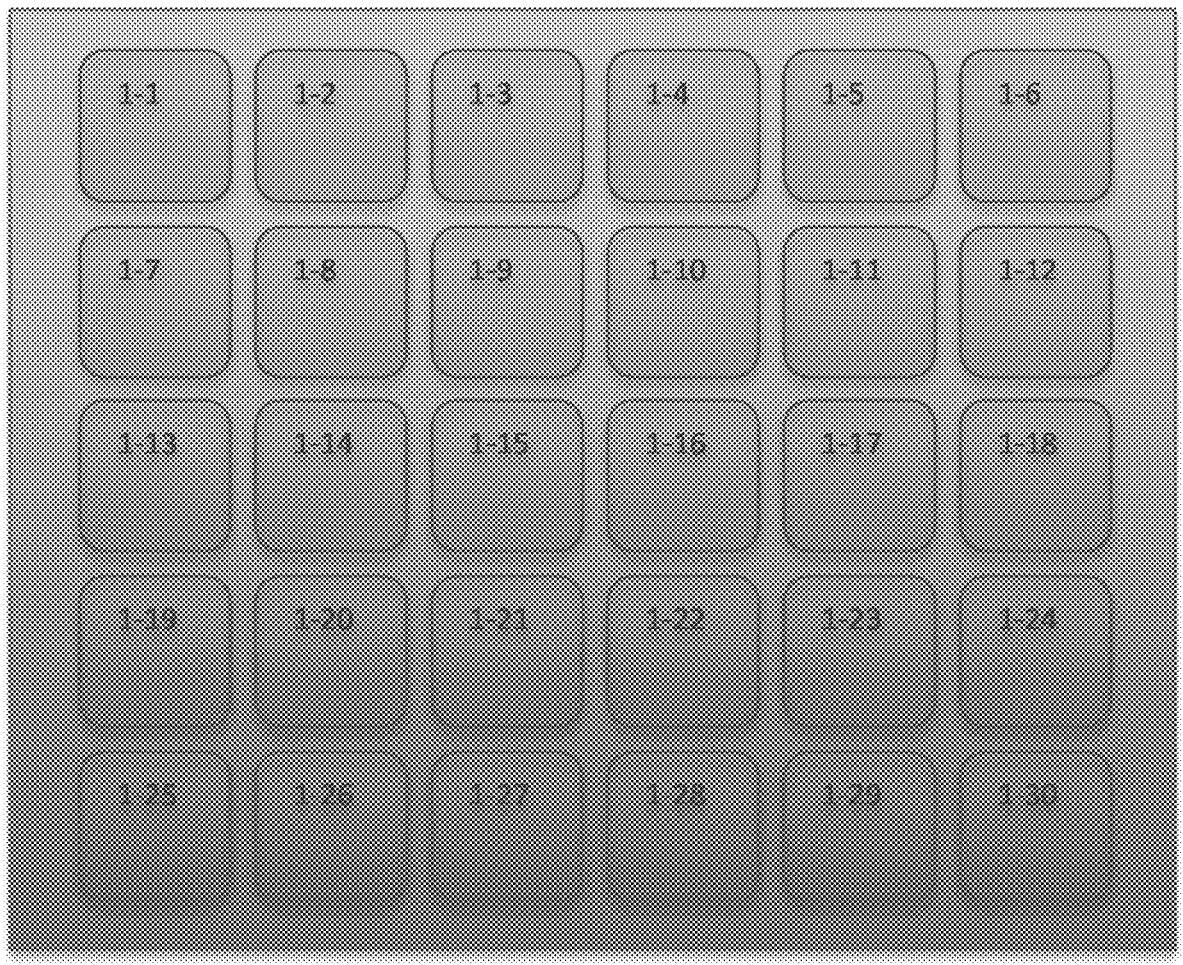
FIG. 5(a) illustrates a grid of spaces or tile locations with an associated identifier that may be used to present information to a user and that may be used in an implementation of an embodiment of the invention.

FIG. 5(a) illustrates a grid of spaces or tile locations with an associated identifier that may be used to present information to a user and that may be used in an implementation of an embodiment of the invention. As shown in the figure, each position or possible tile or card location on the grid is associated with a unique identifier.

Figure 5B:
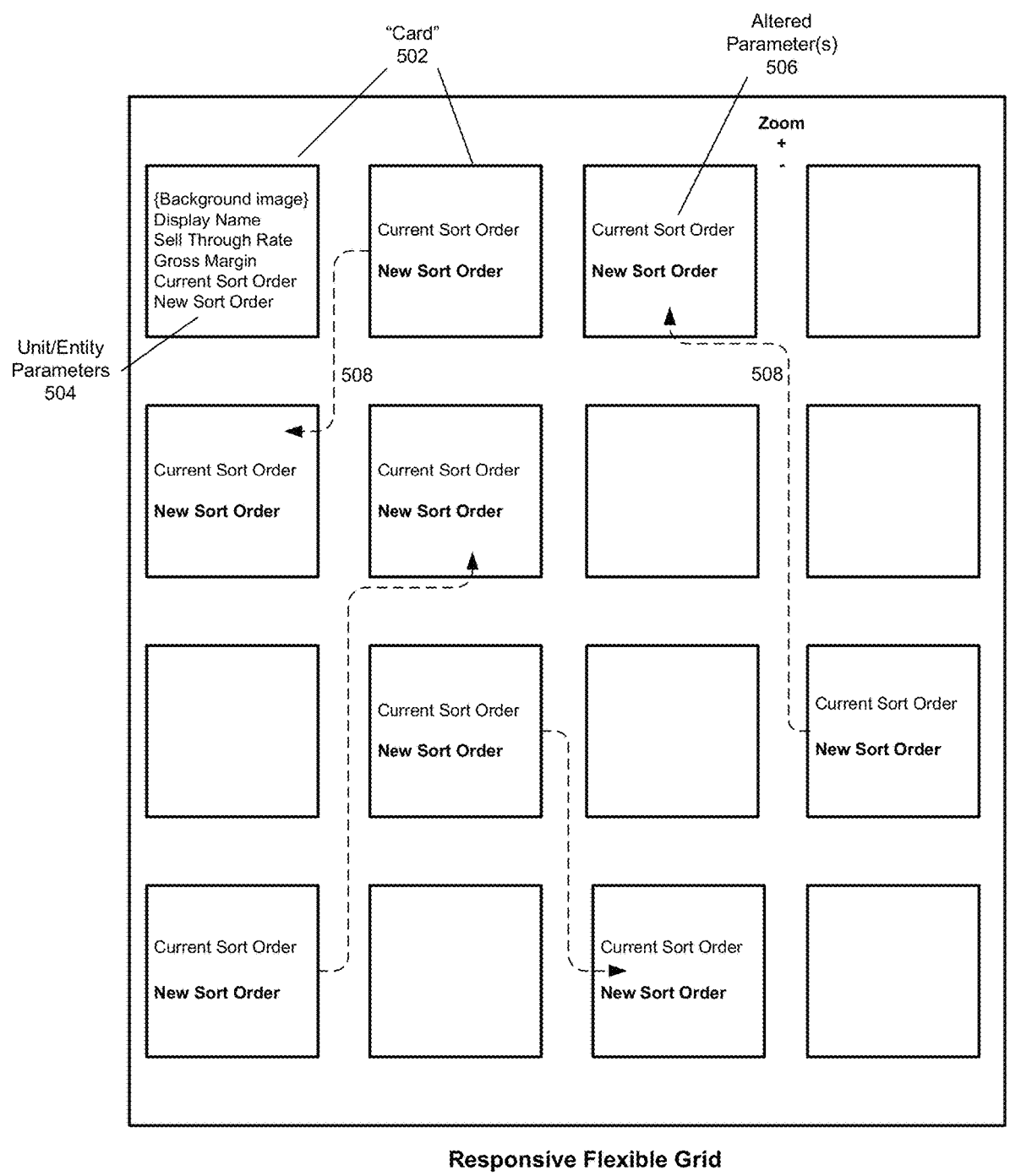
Figure 6:
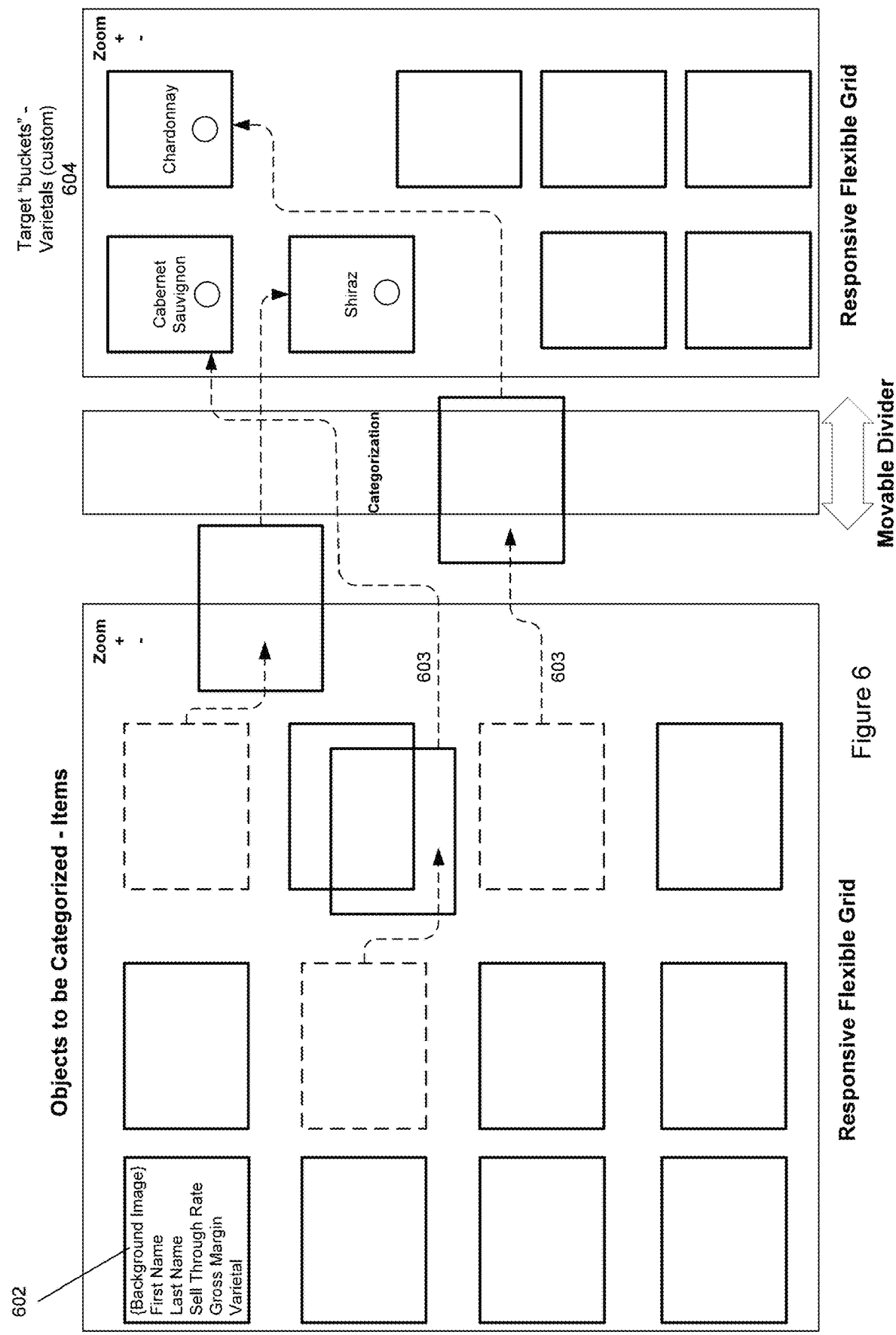
Figure 7:
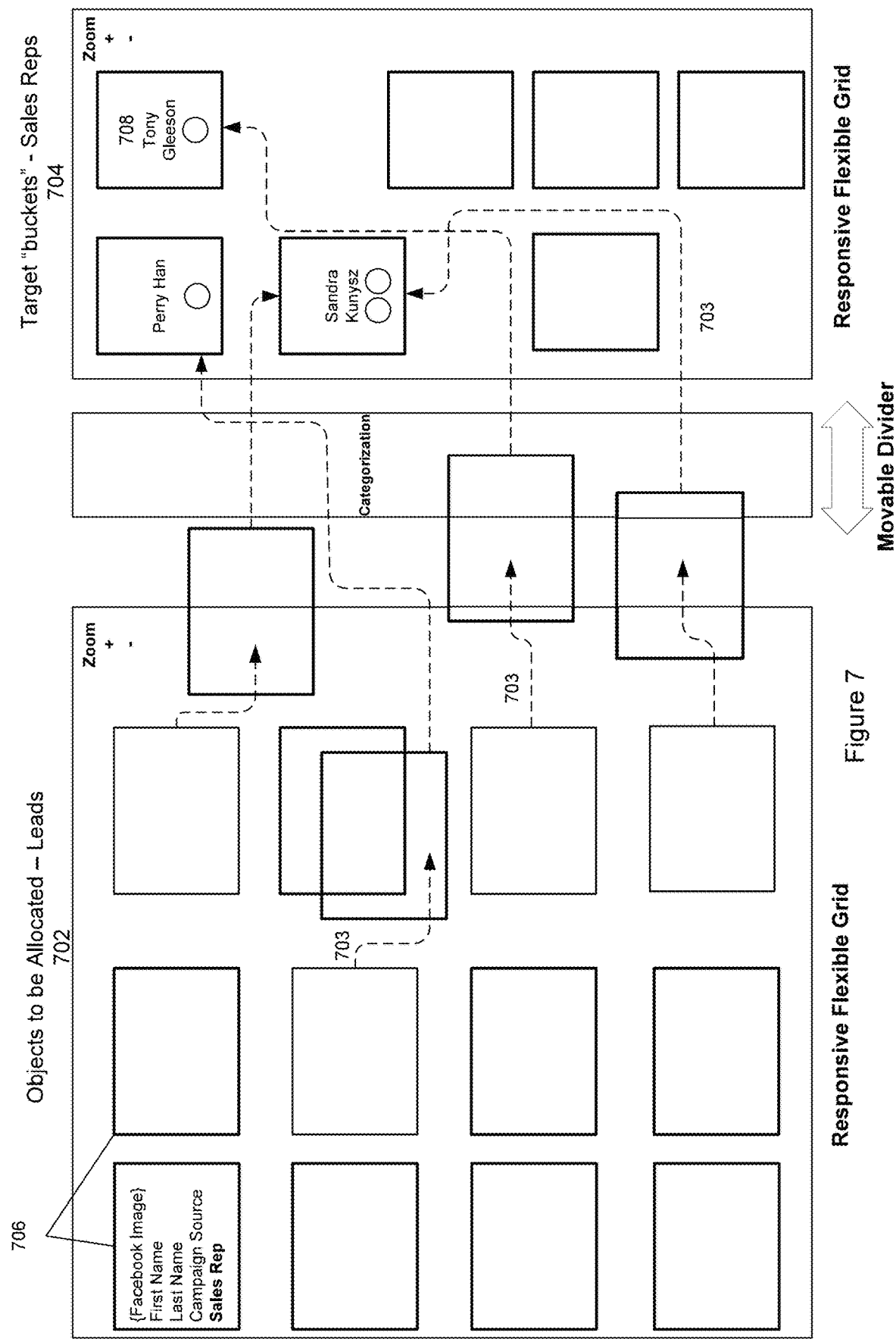
Figure 8:
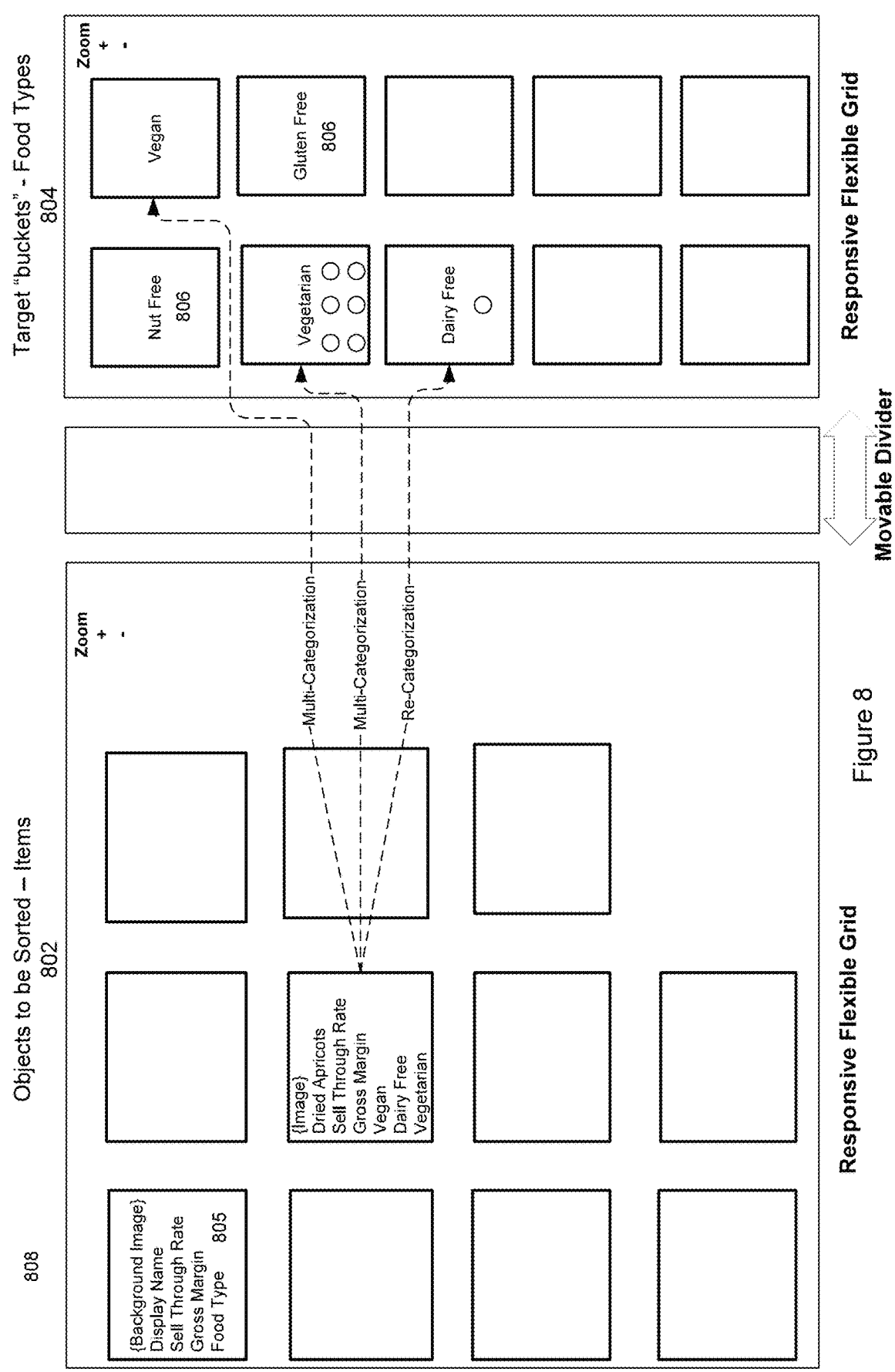

FIGS. 5(b) through 8 are diagrams illustrating example uses of the inventive sorting interface and processes described with reference to FIG. 4. As noted, FIG. 5(b) illustrates how a user might identify or define what the unit or element will be that is subject to the user's drag and drop operations, FIG. 6 illustrates dragging a set of wines into classification buckets (varietal, vintage etc.), FIG. 7 illustrates the assignment of a sales lead to a sales representative, while FIG. 8 illustrates the placement of items into a category.

Referring to FIG. 5(b), in one embodiment the units or elements to be sorted or rearranged are depicted as "cards" 502 that may be placed into categories or regions that are associated with identifying labels (such as a space on a grid). In some embodiments, each unit or element may be associated with a data record. The categories or labels may represent one or more characteristics of a business, parameters related to a transaction, or other type of information. These may be considered the parameters or characteristics 504 of the unit or element 502.

As mentioned, each card 502 may show a set of associated data or characteristics 504 in the current sort order (or other form of hierarchy); as the records are rearranged and sorted by a user, the new sort orders (or hierarchies) for each record are stored in the user's browser. Multiple sorts (and similar operations) may be performed by the user. When the user is satisfied with the results, the records may be "committed". At this point, the user can save the new sort order (or hierarchy) to a database or other data storage element.

In response to the save operation, each record that has a changed parameter (e.g., the sort order) is committed to the database as an update to the record, and is displayed on the cards 502 according to the revised ordering or arrangement 506, as illustrated by the "New Sort Order" characteristic. Note that in this example, each record can be visually moved to its new position in the ordered grid (as suggested by the arrow(s) 508 connecting two locations/positions on the grid). As a visual cue for the user, after the record "card" is placed in its new position by a user, one or more of the following functions/operations may be caused to occur: the item it displaces may be moved down (or up) one position; and/or the new and old sort order parameters may be displayed on each sort card.

In some embodiments, the display of each card may be optimized to include information for purposes of:
a. Identify the record—by image, name, color, shape;
b. Represent the sorting criteria, by color symbol, quantified graphic, alphanumeric or BI (business intelligence) data visualization; and
c. Only represent the data essential to perform the sort; unnecessary or less relevant data display on the record will clutter the UI and slow and decrease the accuracy of the sorting process.

In the example illustrated in FIG. 6, each data record or "card" (which represents a specific wine and its associated information; for example, vintage, winery, source, etc., as suggested by the list 602) is moved by a user's inputs (as suggested by arrow(s) 603) into its target "bucket" or category (element 604, which represents a classification of that wine or further identifier). As a card is moved into the bucket, it is typically no longer shown in the original grid (as suggested by the dotted lines surrounding the moved card(s)). This is because it has been selected and assigned to a category 604 (although it may be indicated by an outline or other form of identification), which in this example is the only sorting operation being performed.

In this embodiment, the UI intuitively informs the user when records have been allocated to their target "buckets". Records/objects to be sorted may remain visible on a zoom-able and/or drag-able grid so that the user can visually determine if there are any records remaining to be sorted (as suggested by the labels "Responsive Flexible Grid" in the figure). In one example, a compact grid function could resize the grid to a more manageable size if it is too large to keep the original size. In one example, this could be done after a subset of the available records (e.g., 100 out of 400 records (a 20 by 20 grid)) have been sorted.

In the example illustrated in FIG. 7, as the sales lead records 702 are moved (as suggested by arrow(s) 703) to their target sales representatives 704 (and hence become associated with or assigned to that sales representative), the new representative allocation for each record is stored in the user's browser. As before, multiple sorting operations can be performed until the user is satisfied with the new lead to sales rep allocation(s) and the records are ready to commit. At this point, the user can save and commit the new allocations to the database. As a result, each record that has a changed parameter (in this case the assigned sales rep and related data or metadata) is committed to the database as an update to the appropriate record. Note that each sales lead may be a data record that is represented by a "card" and that contains specific information and data 706 (and/or metadata) regarding the lead. Each target category (in this case a sales representative and associated data, information or metadata) may be displayed as a person or organizational unit 708.

In the example illustrated in FIG. 8 (and in contrast to the example illustrated in FIG. 6), the record to be sorted stays in the originating grid 802, as multiple value assignments of a single property are allowed. Both the sort card (in region 802) and the target bucket (in region 804) may be configured to display the applied properties. On the left portion of the figure, each record shows the property values 805 and on the right each property shows the assigned records 806.

As described herein, embodiments of the invention may be used as part of a UI for a core ERP (or CRM, eCommerce, HR, etc.) application, or other type of application in which data records are created and processed. In such uses, the invention provides a visual representation of database entities that allows records to be sorted and arranged in a more intuitive and efficient manner than conventional approaches, while providing a mechanism for changing the sort values or properties that are the goal of the sorting exercise or rearranging process(es).

Note that in these types of uses, the database that is coupled to the UI contains data that is used by and accessible by one or more business data processing applications (ERP, CRM, eCommerce, HR, etc.). Thus, one result of using an embodiment of the invention in this use case is to create a new order/positioning of the content that can be searched or subjected to data processing by those applications. In such a use, the new data sort or classification arrangement is accessible to the suite of business data processing applications, where it can be searched, evaluated, subjected to further processing, presented as required, modeled, analyzed, etc. This may also be used to "infer" the relative preference of the user for the objects displayed.

Note that depending upon the device or screen resolution, a "page" of the display may show a greater or lesser number of grid spaces and hence "cards" or tiles. For example, a page may have 20 cards; in such an example, a page can display 20 Items when a shopper visits the online store. Alternatively, a user interface display page having higher resolution may show 30 cards. As illustrated in FIG. 5(*a*), each location in the grid is uniquely identified (as indicated by the identifier 1-1, 1-2, 1-3 . . . ). Note that the user interface may provide a mechanism to change the resolution using a zoom (+/−) paradigm.

Each card/tile may include one or more display regions for data associated with the object that is represented by the tile. FIG. 9 is a diagram illustrating an example of a tile, icon, or card 900 that may be used as part of implementing an embodiment of the inventive system and methods. As shown in the figure, the card/tile/icon 900 may include an image 902 and one or more display regions 904 for alphanumerical data (such as a ranking, a data value, a result of evaluating a function or combination of data values, etc.).

The display regions 904 may each display a value of a data field that is associated with the object. The data fields may be part of a data record for the object. For example, if the object is an eCommerce item, the display regions may display a value of one or more of the following: the price, the inventory level, the profit margin, the number of purchases of the item in the previous day, week, month, quarter, the estimated delivery day if ordered within 24 hours, etc.

In some embodiments, one or more of the displays 904 of the data fields may be updated, revised, or generated based on changes to the raw data values or the evaluation of a function of the raw data values, where the raw data is stored in an underlying database. The database may contain the values of ERP, CRM, eCommerce, financial, or HR data, among other types. The database may be used as part of implementing a single tenant or a multi-tenant business data processing platform or system.

In some embodiments, the icons, tiles or cards may be positioned (or re-positioned) on the grid by an automated process, in an order based on the numerical value of such a function. The function may be expressed as a combination of the values in the data fields (as combined, if desired, by logical and/or Boolean operators), and/or as the result of processing data contained in the data fields suing a suitable data processing application. The numerical value associated with an object as determined by evaluating the specified function or combination may be ordered either greatest to least or least to greatest, and then placed in an appropriate place on the grid. Here, the appropriate place on the gird refers to in numerical order of greatest to least or least to greatest value, as arranged from the top left corner of the grid across a row, starting at the left side of the next row, across the second row . . . until the bottom right corner of the grid. Note this corresponds to an inherent concept of viewing elements of either increasing or decreasing value in an arrangement corresponding to how a page may ordinarily be read by a user (left-to-right, top-to-bottom).

Thus, among other embodiments or use cases, the inventive system and methods may be used to perform one or more of the following operations or functions:

- display a set of icons, tiles, or cards representing a set of objects on a grid comprised of a plurality of display regions, with each such region having an associated unique identifier or position, where as described below, an initial display may be based on a sorting operation defined by a user and/or as the output of an automated sorting operation;
- display one or more images and/or data display regions on the icons, tiles, or cards;
- update, revise, or otherwise alter a data value shown in a data display region that is part of a tile for an object, with that updating, revising, etc. being performed so as to reflect a value for a data field as stored in an underlying database;
  - where the data field that is associated with an object may be populated by an ERP, CRM, eCommerce, HR, financial, or other type of business data processing application;
- present an initial arrangement of the icons, tiles, or cards based on a sorting or ranking operation, where the sorting or ranking operation is performed in relationship to the object characteristic(s) represented by the value or values in one or a combination of the data display regions (which may represent a data field or data fields that are part of a data record associated with the object);
- permit a user (such as a merchant or system administrator) to (re) arrange the results of the initial or a later arrangement by using a drag and drop user interface metaphor;
- assign to each object an identifier or indicia based on its position in the grid of display positions;
- in some cases, maintain the position on the grid for each object based on its identifier or indicia, while updating or revising one or more of the data display regions based on changes to the data record for the associated object;
- in other cases, rearrange the order or positioning of the icons, tiles, or cards for one or more of the objects based on performing an evaluation of a function or combination of the values of one or more of the data fields associated with an object; and placing the icons, tiles, or cards in a specific order on the grid based on their respective value of the evaluated function or combination, where the specific order is in terms of a ranking from greatest value to least, or least to greatest, and further, where the rearrangement places the object having the greatest value (or the least) at the upper left space on the grid, and the object having the least value (or the greatest) at the lower right space on the grid.

In general, the embodiment of the inventive system and methods described with reference to FIG. 4 relates to the ability of a merchant user to reorder how a set of products are presented to a viewer, and to maintain that order/arrangement while displaying values of one or more characteristics associated with each product. In other situations, embodiments of the invention may be used to generate other types of displays based on more complex sorting/ordering operations.

Figure 10:
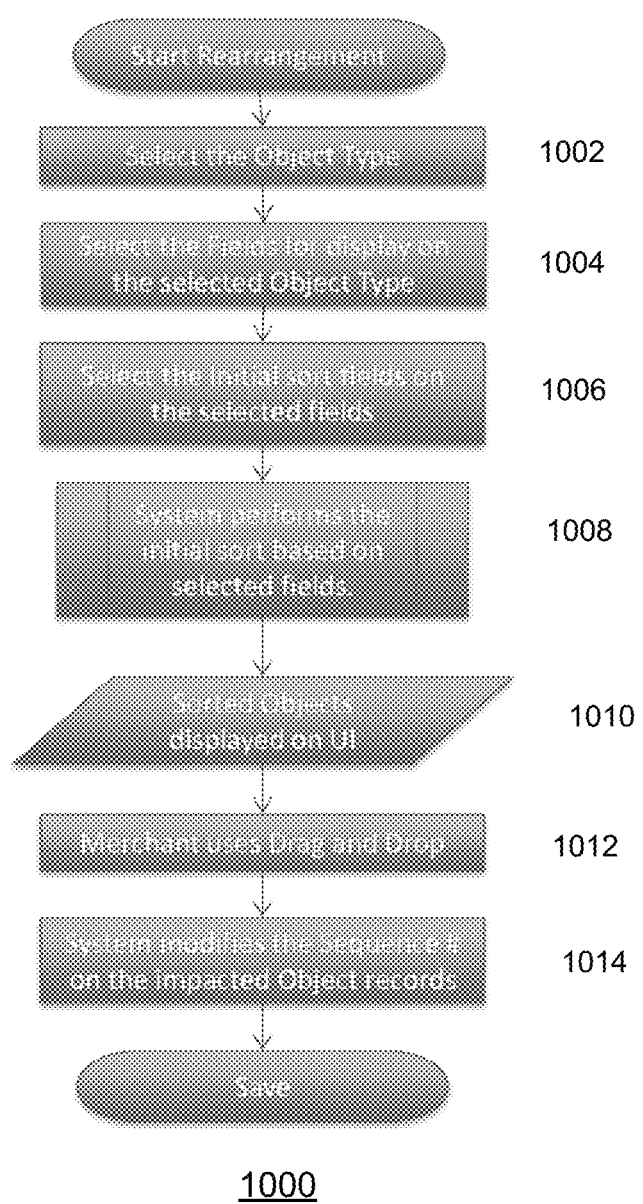
FIG. 10 is a flowchart or flow diagram illustrating an exemplary method, process, function, or operation that may be used in an implementation of an embodiment of the invention.

FIG. 10 is a flowchart or flow diagram illustrating an exemplary method, process, function, or operation 1000 that may be used in an implementation of an embodiment of the invention. As shown in the figure, a user (e.g., a merchant or eCommerce webpage administrator) may select a class or category of "objects" for display. These may be categories of apparel, a set of employees, a set of services, etc. (as suggested by step or stage 1002). Next, the user identifies (by selection from a list or by providing data inputs) the characteristics of each object in the set that are to be displayed using a data display region on an icon, tile, or card corresponding to each object (as suggested by step or stage 1004). Next, if desired, the user may select or define an initial sort or selection process based on one or a combination of the data fields (as suggested by step or stage 1006). The system performs the initial sort based on the underlying data field values (as suggested by step or stage 1008). The result of the sort or selection operation may be displayed by arranging the respective icons, tiles or cards randomly or in an order on the grid (for example in terms of greatest sort value to least and arranged top to bottom for each column or left to right for each row), as suggested by step or stage 1010. Next, the user may manipulate and rearrange one or more of the icons, tiles or cards using the drag and drop functionality of the user interface (as suggested by step or stage 1012). Next, the inventive system modifies (where necessary), the sequence number or identifier for the affected objects and saves the results to the database (as suggested by step or stage 1014).

Hierarchical Sorting/Displaying

In some cases, a merchant may wish to display or work with multiple categories or with categories and sub-categories, while retaining a display that shows a sorting operation performed on each sub-category independently of another sub-category. Consider the following as example classes/categories that may be used for illustrating a hierarchical sorting of records:

1) Apparel Category
  a) Size
    i) Brand
      (1) Color
        (a) Price
          (i) Material
            1. Shipping From
              a. Delivery Estimate In the above example, the records are grouped/ordered by different parameters that are generally found on a given item record. This grouping/ordering may be enhanced by interlacing the ordering with records based on real-time data in the system, such as inventory levels, shipping costs, etc.

Figure 11A:
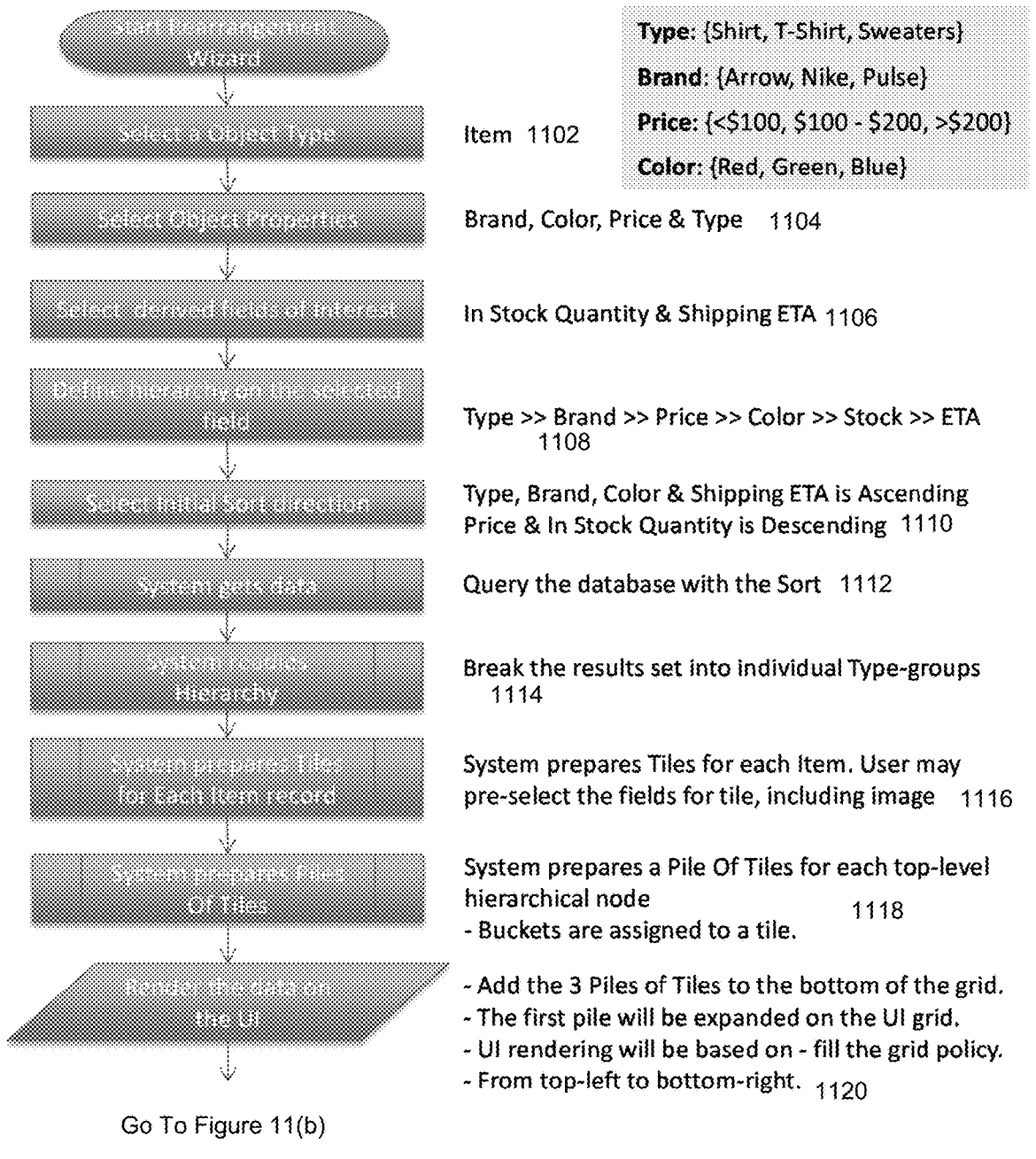
FIGS. 11(a) and 11(b) are flowcharts or flow diagrams illustrating an exemplary method, process, function, or operation that may be used in an implementation of an embodiment of the invention.
Figure 11B:
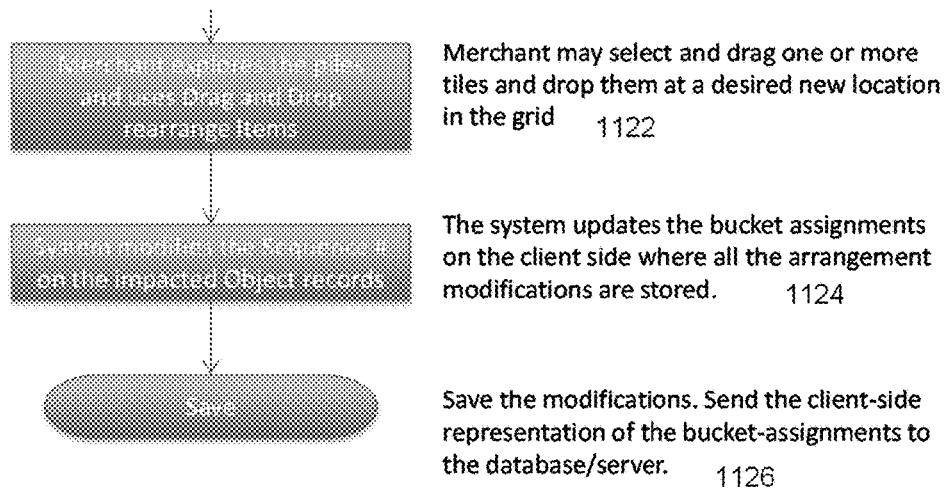

In general, for a hierarchical sorting of records there are characteristics which a user may alter or arrange and others which are generated by the underlying data processing or data collection operations. For example:

(merchant may specify/arrange)
1) Apparel Category: Shirt
  a) Size: S
    i) Brand: Arrow
      (1) Color: Blue
        (a) Price: <$100.00
          (i) Material: Cotton
            (the next set of dimensions are dynamic, derived from business related data)
            1. Inventory Level: 10
              a. Shipping from: 50-mile radius
                i. Delivery Estimate: 1 week (Free)
                ii. Delivery Estimate: 3 days ($5.00)
            2. Inventory Level: 100
              a. Shipping from: 25-mile radius
                i. Delivery Estimate: 2 days (Free)
                ii. Delivery Estimate: 8 hours ($8.00)
          (ii) Material: Polyester
        (b) Price: Between $100-$200
        (c) Price: >$200
      (2) Color: Green
      (3) Color: Red
      (4) Color: Yellow
    ii) Brand: Bobby John
  b) Size: M
  c) Size: L
2) Apparel Category: T-Shirt
  a) Color: White
    i) Size: S
  b) Color: Red
  c) Color: Pink
  d) Color: Lavender In some embodiments, a merchant user can start the process of ordering the objects by interacting with a "wizard" like interface. FIGS. 11(*a*) and 11(*b*) are flowcharts or flow diagrams illustrating an exemplary method, process, function, or operation that may be used in an implementation of an embodiment of the invention. The method, process, etc. illustrated in FIGS. 11(*a*) and 11(*b*) may utilize a form of hierarchical sorting in order to generate an initial presentation of the icons, tiles or cards.

As shown in FIG. 11(*a*), initially a user selects an object type and the properties of interest, including the derived properties based on applications or application parameters (as suggested by steps or stages 1102 and 1104). In this example, the object type was selected to be shirts, T-shirts, and sweaters, while the properties of interest were selected to be brand, color, price, and type. Note that these parameters/properties may become dimensions for establishing a desired hierarchy. The user then selects or identifies the derived (or calculated) fields of interest, in this case the quantity in stock and the estimated time of arrival for a shipped item (as suggested by step or stage 1106). Next the desired hierarchy of the selected fields is introduced, as shown in step or stage 1108 (where this may be determined by the user and/or by a process that bases the arrangement on the ranges of data, etc.). Parameters for an initial sorting or ordering process may then be defined, in terms of ascending order, descending order, etc. (as suggested by step or stage 1110). The underlying data processing system then accesses the database containing the data records for the objects and returns the sort results (as suggested by step or stage 1112). These sort operation results are then separated or broken up into groups by the Type of object (as suggested by step or stage 1114). Next, an appropriate icon, tile or card is prepared for each item (as suggested by step or stage 1116). The invention then prepares a set or pile of tiles (or icons, cards, etc.) for each top level node in the hierarchical arrangement (as suggested by step or stage 1118). Each pile is then rendered as an image in a space on a grid, as suggested by step or stage 1120.

Next, as shown in FIG. 11(*b*), a merchant/user may select and re-position one or more of the icons, tiles or cards using the capabilities of a drag and drop process (as suggested by step or stage 1122). This permits a merchant to arrange the presentation of the objects in the positions they desire on the grid. The system then updates the stored information about the locations of each object tile on the grid and/or information regarding how the merchant has grouped the displayed objects (such as in buckets or sets of objects), as suggested by step or stage 1124. After this, the data describing the desired arrangement is saved locally and data may be transferred to a remote database server (as suggested by step or stage 1126).

Note that once the information/data regarding the objects is accessed and loaded into memory (from an underlying database or platform), the process may operate on the information/data to identify the individual dimensions or characteristics of an object.

For example, once the record-set is ready,

Relevance ranking is calculated using the weighting on each of the parameters. The derived parameters are weighted higher than the others. An example might be where a formula puts the least weight on the first sort parameter. The ranking may also be higher for the records with data values based on the direction of the sort. For example, on a descending sort the bigger the value, the higher the rank. So in a sorted set of {5, 4, 3, 2, 1}, the record with value of 5 will be ranked higher than a record with a value of 1. Thus, every record will likely have a unique ranking:

The ranking on these records will change dynamically based on the runtime values of the derived parameters. For example, if the user requests an ascending sort on the "In Stock Quantity" parameter, then as the stock quantity of the Item drops, the ranking of the record grows higher. This allows for the promoting of an Item that is either A fast selling Item that a shopper must get access to ASAP & increase sales; or An inventory that is lingering around that needs to be subjected to clearance pricing or promotions to make space for other popular items in the warehouse; and The system then prepares for rendering the Tiles followed by making the bucket-assignments for each tile in the dataset. The UI may then display the Piles of Tiles (e.g., illustrated as one or more sets of tiles, with each set collected or in a stack, and able to be selected by a user) and have an expanded view of one of the piles with the individual Tiles displayed according to the bucket assignment.

For example, consider an online store analogy in the case of multiple apparel items. In a traditional system when the sorting is done using, the "color" dimension (assuming an ascending order), then all of the Blue apparel items are placed ahead of Green, followed by Red and finally Yellow apparel items. One may then add a second order of sorting on Price, or if desired add a grouping criteria. However, using an embodiment of the inventive system and method, this sort-order or grouping is easily altered and may be based on a different permutation and/or combination of Color, Price, Availability, User Preference, Shipping cost, etc.

As an example of how the underlying data may be modified and processed, Table T1 represents the initial mapping achieved in step or stage 1118 of FIG. 11(*a*), for the ordering Items on a grid. This assignment happens at the mapping and may be performed with any enterprise objects including, but not limited to, Employees, Contacts, Shopping Items, Video, Picture/Image, Audio, etc.

TABLE T1

Database Table Representation for Storing a Card-Object Mapping

| Card ID | Object ID |
| --- | --- |
| 1-1 | A |
| 1-2 | B |
| 1-3 | C |
| 1-4 | D |
| 1-5 | E |
| 1-6 | F |
| 1-7 | G |
| 1-8 | H |
| 1-9 | I |
| 1-10 | J |
| 1-11 | K |
| 1-12 | L |
| 1-13 | M |
| 1-14 | N |
| 1-15 | O |
| 1-16 | P |
| 1-17 | Q |
| 1-18 | R |
| 1-19 | S |
| 1-20 | T |
| 2-1 | U |
| 2-2 | V |
| 2-3 | W |
| 2-4 | X |
| 2-5 | Y |
| 2-6 | Z |
| 2-7 | NULL |
| 2-8 | NULL |
| 2-9 | NULL |
| 2-10 | NULL |
| 2-11 | NULL |
| 2-12 | NULL |
| 2-13 | NULL |
| 2-14 | NULL |
| 2-15 | NULL |
| 2-16 | NULL |
| 2-17 | NULL |
| 2-18 | NULL |
| 2-19 | NULL |
| 2-20 | NULL |
| 3-1 | NULL |
| 3-2 | NULL |
| 3-3 | NULL |
| 3-4 | NULL |
| 3-5 | NULL |
| 3-6 | NULL |
| 3-7 | NULL |
| 3-8 | NULL |
| 3-9 | NULL |
| 3-10 | NULL |

As shown in the Table, the cards are statically pre-ordered in a form of numerical order (in this case defined by an identifier of the form "page number-display region number"). However, the reference to the contained object (e.g., Item, employee, contact, etc.) may be changed as desired/defined. Because of this abstraction, the underlying data model may remain unchanged while at the same time the bucket may be associated with any data object/record. In other words, the same bucket (say 1-1) may hold an item, or employee, or parts, etc. This enables the system to extend itself to other object types of an enterprise cloud application.

The Type of entity may be represented as a Pile of Tiles for a user to select from, since each card on the UI grid is a container and may hold any object of interest. When the shopper is searching for cars, a card might refer to a manufacturer, such as Honda, Toyota, etc. However, when a "shopper" of employees (a recruiter) is using the invention, the cards would hold the candidates. This abstraction is made available because the card (container) is uniquely numbered and may hold/show any object, because in the database is stored a simple machine-readable identifier against the card ID. This abstraction allows the flexibility to easily adapt the same UI for different applications.

For the use case of an online eCommerce store, a merchant/shopkeeper may arrange the Items in a personally desired order by taking one or more of the following actions while accessing their administrative page display controls:

1. Request an auto sort/ordering based on; (note that in some embodiments, these characteristics could individually be represented as contained in a pile of Tiles):
   Price;
   Category;
   Available stock units;
   Historical order quantity (hot selling Items);
   High profit margin items;
   Shipping cost;
   Delivery ETA; or
   Other defined characteristic; and/or
2. Drag and drop items from one card to another card that may or may not be on the same page.

When a shopkeeper performs a drag-and-drop operation on an item or items across different cards, the data table T1 is updated to reflect what should be shown for each card in the user interface display. In some embodiments, each card may contain a pictorial representation of the Item along with certain categorical information or characteristics (e.g., size for apparel or shoes). For example, a tile or card may present information or data regarding the available quantity of the item in a Medium size, the selling price, and the profit margin. In some embodiments, each entity may be associated with a pile of cards. This pile may be organized by use of an appropriate selection element that is part of a user interface.

In a different use case, assume that an HR manager wants to arrange employees in a certain order, but wants to group them alphabetically. In this case, the HR manager may decide to show a group break (separator) by using an empty card between two alphabet groups. This would help the HR manager to get an overview view of their team and quickly see the values of several factors related to the team, while presenting the team in accordance with one or more sorting methods. Potentially, a manager could use the inventive soring and ordering capability to group the team members based on their performance, number or importance of pending tasks, etc. An example employee tile/card may include a picture of the employee, name, nickname, join date, title and location information for the employee. These parameters may be changed based on the needs of the end application or use. A data Table (Table T2) such as that shown may be used to store the information associating an employee/object with a location on the grid.

TABLE T2

Database Table Representation that Stores a Card-Employee Mapping with Group Dividers

| Card ID | Object ID |
| --- | --- |
| 1-1 | A1 |
| 1-2 | A2 |
| 1-3 | A3 |
| 1-4 | A4 |
| 1-5 | A7 |
| 1-6 | A8 |
| 1-7 | A9 |
| 1-8 | A10 |
| 1-9 | NULL |
| 1-10 | B1 |
| 1-11 | B2 |
| 1-12 | B3 |
| 1-13 | B4 |
| 1-14 | B6 |
| 1-15 | B8 |
| 1-16 | B9 |
| 1-17 | NULL |
| 1-18 | C1 |
| 1-19 | C3 |
| 1-20 | C8 |

Note that Tables T1 & T2 could be implemented so as to support a multi-tenant environment without impacting each merchant's store. The inventive system and method may be used to customize/personalize the Item display/organization to an individual user by presenting the information cards in a manner that is based on the shopper's historical shopping behavior. The arrangement Tables T1 & T2 may be implemented to have the capability of storing the arrangement per tenant (on a cloud application), and further, per user within a tenant account (as suggested by Table T3 below).

TABLE T3

Database Table Representation that Stores the Card-Employee Mapping with Group Dividers Along with Tenant and User Information

| Tenant ID | User ID | Card ID | Object ID |
| --- | --- | --- | --- |
| 111 | 1A1 | 1-1 | A1 |
| 111 | 1A1 | 1-2 | A2 |
| 111 | 1A1 | 1-3 | B1 |
| 111 | 1A2 | 1-1 | A1 |
| 111 | 1F8 | 1-1 | A2 |
| 111 | 1F8 | 1-2 | B1 |
| 111 | 1F8 | 1-3 | A7 |
| 111 | 1F8 | 1-4 | A10 |
| 222 | 5DA1 | 1-1 | G31D |
| 333 | WR21 | 1-1 | BD231 |

In this example (as represented by Table T3), the user "1A1" of tenant "111" will be able to see 3 objects on the first three Tiles on the UI, whereas the user 1F8 of tenant "111" will be able to see 4 objects. Note that data privacy and confidentiality is maintained because Users in tenant "222" & "333" will not have visibility into the objects of tenant "111".

In an online store use case, when an end customer (a shopper) searches for a product, the system may search for all the matching criteria and return the results for display. This search process is likely to filter out some of the items from the original order. At this time, the inventive system works with this new result set to create a temporary mapping representation that is used by the rendering engine (as suggested by Table T4 below).

TABLE T4

Temporary Cache Representation for the UI Rendering Engine

| Original Card ID | Object ID | UI Card ID |
|---|---|---|
| 1-1 | A | 1-1 |
| 1-2 | B | 1-2 |
| 1-3 | C | 1-3 |
| 1-4 | D | NULL |
| 1-5 | E | 1-4 |
| 1-6 | F | NULL |
| 1-7 | G | NULL |
| 1-8 | H | NULL |
| 1-9 | I | 1-5 |
| 1-10 | J | 1-6 |
| 1-11 | K | 1-7 |
| 1-12 | L | NULL |
| 1-13 | M | 1-8 |
| 1-14 | N | NULL |
| 1-15 | O | 1-9 |
| 1-16 | P | 1-10 |
| 1-17 | Q | NULL |
| 1-18 | R | NULL |
| 1-19 | S | 1-11 |
| 1-20 | T | 1-12 |

Here the rendering engine will use the "UI Card ID" column to render the results into contiguous cards. The records with "UI Card ID=NULL" will be skipped on the UI.

Note that multiple, pre-configured arrangement/ordering is made possible by the piles of Tiles that the user may select to use and make modifications. These are driven by rules defined in the system, such as (but not limited to):

All items priced less than $100;

Medium sized t-shirts;

Lemon-colored, Medium sized t-shirts;

Size 10 Branded shoes that could be delivered to San Mateo, Calif. under 2 days with shipping costs at minimum; or Recommended accessories to items in the cart.

In some advanced cases, the UI may have a mix of single item or a Pile of Tiles and the user may be able to go back and forth between each. In some cases, a Pile of Tiles may be distinguished in a database table using an additional flag.

Figure 12:
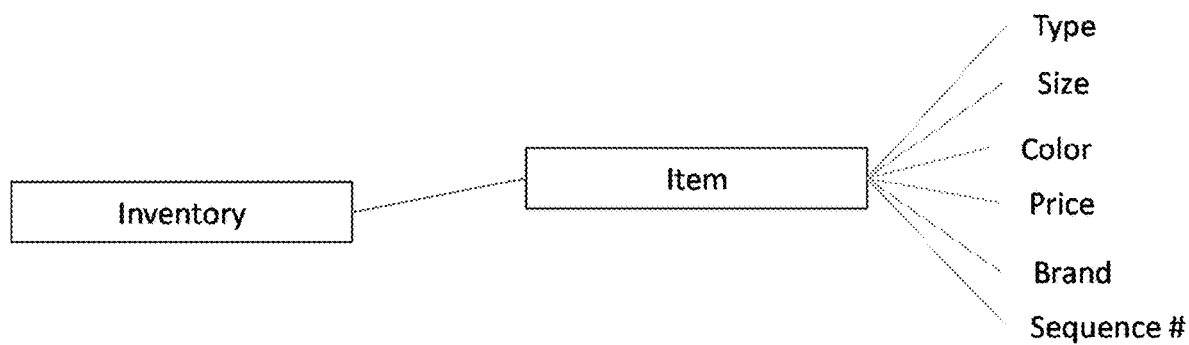
FIG. 12 is a diagram illustrating an example data model that may be used as part of implementing an embodiment of the inventive system and methods.

FIG. 12 is a diagram illustrating an example data model that may be used as part of implementing an embodiment of the inventive system and methods. As shown in the figure, such a data model for an eCommerce application or process may contain information about an object that is linked to categories or classes of information.

Figure 13:
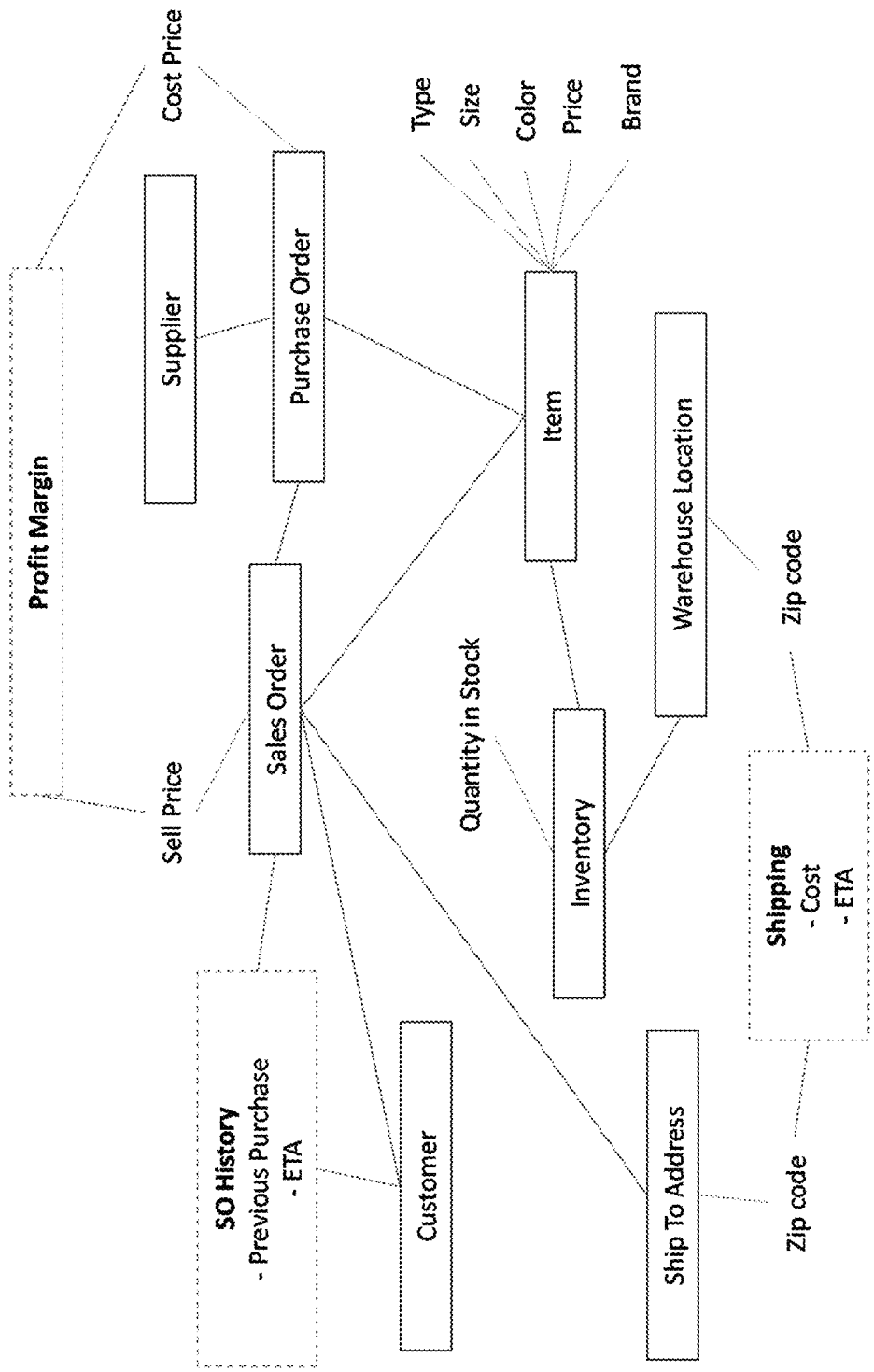
FIG. 13 is a diagram illustrating an example data model for a suite of applications (such as ERP, eCommerce, CRM, etc.) that may be used as part of implementing an embodiment of the inventive system and methods.

FIG. 13 is a diagram illustrating an example data model for a suite of applications (such as ERP, eCommerce, CRM, etc.) that may be used as part of implementing an embodiment of the inventive system and methods. As shown in the figure, such a data model or process may contain information about an object that is linked to categories or classes of information and is used by one or more business data processing applications to generate business metrics and other information of relevance to the operation of a business.

Note that by implementing an underlying database as an integrated data storage element for multiple types of information regarding a business (ERP, CRM, HR, eCommerce, Financial, etc.), embodiments of the inventive system and methods enable the generation and representation of multiple aspects of the business, its real-time operation, dynamic changes to its operation, interrelated factors that impact its operational metrics, etc.

Embodiments of the inventive system and methods provide users with multiple ways to develop a better understanding of the operations of their business, while also providing improvements in how items or objects are presented to a shopper. In one sense embodiments of the invention represent an additional sorting or classification system and method. The "tiles" or "cards" (or other representative metaphor) may enable a user to recognize and better understand the business knowledge needed to make complex decisions about merchandising, buying, purchasing, inventory management, transfer, advertising, financial structuring, etc. For example, a merchandiser may wish to use a sorting operation based on complex and different criteria, such as slow moving stock, plus best sellers, plus high margin items. This possible strategy would drive cross sell of slow and high margin items by positioning them alongside the bestselling items. A merchant may also wish to present a group of items to a shopper, with the arrangement of the items based on specific recommendations for that shopper and/or on current business needs of the merchant.

However, conventional sorting mechanisms are relatively time consuming and laborious and have to be visually checked, often in a more native and intuitive view than the data object view in which the sorting is taking place. In contrast, embodiments of the inventive system and methods overcome this disadvantage by combining the end result UI with the sorting/arranging mechanism. For example, in an eCommerce use case, the conventional approach is to sort first and then check the website result second to confirm the desired result. For the assignment of leads to a sales representative use case, the conventional approach would be to allocate the leads and then check each representative's allocation. In both use cases, additional effort is required to confirm the accuracy of the sorting or rearranging operation.

Based on the inventors' experience, it is believed that the inventive approach is more intuitive and provides a faster and hence more efficient method of performing the sorting/arranging operations (e.g., it is estimated that the inventive approach is one or more orders of magnitude faster than the conventional methods). In addition, because the inventive approach reproduces a similar UI to the end user experience, it allows a user to sort and place objects as the end user will see them (or want them to be seen), rather than by using the non-intuitive conventional methods. This should save time and increase accuracy as use of the inventive approach reduces (or eliminates) the repetitive/iterative process of sort, check-on-website, sort, and check-on-website because the inventive sorting mechanism better mimics the website page display experience.

Note that although one implementation/use case of the invention is for purposes of eCommerce sorting of a category, the inventive system and methods have broader application. An embodiment of the invention may be used for other forms of sorting, classifying, ordering or moving of data objects (including, but not limited to ERP, CRM, HR, financial, etc.), and as described herein, may be implemented via a user driven "wizard" approach. In general, an embodiment of the invention may provide advantages when using a record set for which there is an existing laborious, time consuming process needed to change a single or multi-valued parameter across a large number of records. Although the invention is most easily applied to integer property or discrete values, a free value or user defined value "buckets" may be used to extend the invention in this regard.

Embodiments of the inventive system and methods permit ordering to be based on one or more desired characteristics (Price, Type, Name, Color, etc.) of an item or product. Embodiments of the inventive system and methods permit a user to introduce an ordering methodology and apply it to a set of data records. This methodology may be implemented by using a "drag and drop" metaphor or paradigm, with which the invention enables a user to construct an association between the position of a data record on a visual display and its underlying characteristics, data fields, or values. The invention uses the selection, position or placement of an icon, tile or card to indicate a user's preferences for the arrangement of an object on a display. Each object has a corresponding data record containing a set of data. Embodiments may also permit the user to select which of one or more characteristics are to be used as the basis for a sorting or ordering process. These one or more characteristics may be data fields, records, sub-records, etc., and may represent data associated with a specific eCommerce item (such as color, price, inventory level, profit margin, etc.). The user's placement of a tile associated with an item in a specific position on a display is used by the invention to generate an identifier which is associated with the data records related to the item, but has a value unrelated to the item data and is intuitively associated with a position on a grid.

The position of a tile (e.g., as part of a grid of "boxes" into which the tile may be "dropped") is used as an identifier for the item (and as result, for its data records). This operates to link the tile and a display of any data fields associated with the item to the identifier for purposes of providing an arrangement of the tiles to a customer or employee, and if desired, presenting the tile with updatable data fields (the previously mentioned "characteristics" or data fields associated with the object represented by the tile). These updatable fields may represent one or more aspects of the item, such as price, inventory available, expected delivery time, profit margin, color, style number, etc.

Although embodiments of the inventive system and methods may be used in a variety of contexts, as mentioned, one of the most useful is that of the display of items on an eCommerce web-site. This is because in the case of online commerce, the sorting of items is another way of determining product placement in an online store display (i.e., an eCommerce application webpage). However, the sorting operations performed on data records as part of an enterprise data processing application (e.g., a strictly alphabetical and/or numerical sort based on a single attribute of an object) differ from those involved in the product placement that occurs as part of an online store.

This is because in an online store, sorting is not always based on an alphabetical or numerical ordering of an item name or identifier, but may be based on one or more other characteristics of interest to a merchant or shopper (e.g., price, size, color, material, style, availability, inventory level, shipping time, etc.). Further, in an online store display, it may be desirable to have the product placement be different for different shoppers (note that this is unlike the case for brick & mortar stores which are limited to a presentation that is intended for multiple shoppers).

Further, this product placement could be desired to be altered based on expected viewer preferences, current or predicted inventory levels, generated recommendations, user browsing behavior, merchant promotions, available discounts, etc., and in some cases may be altered multiple times a day or even during a single user session. Therefore, as recognized by the inventors, for an online store it is beneficial to associate the arrangement/sorting of items based on the location where an item is positioned on the user interface to one or more of the underlying characteristics of an item (as expressed by a data field of a data record).

In some embodiments, the initial sort that functions as a selection of objects for a set to be displayed and rearranged (if desired) may be based on a recommendation engine, analysis of previous purchases by shoppers have a similar demographic characteristic as a current shopper, or other relevant selection or recommendation criteria or method. A merchant may then use the drag and drop user interface metaphor to rearrange the tiles or cards representing those objects into a desired visual arrangement to present to a shopper.

In a typical example, a merchant may wish to display a set of shirts on a webpage. To select the set, they may select tiles or cards representing the shirts from a pile or bucket. In addition, or instead, a merchant may enter a search term, such as a specific color, size, cost range, fabric type, etc., and use the results to populate the set. Once the set has been selected, each object in the set (in this case, each shirt that satisfies the search term(s)) is presented in the form of a tile or card arranged on a grid, with one tile or card to each uniquely identified space or region.

The merchant may now use the capabilities of a drag and drop user interface metaphor to select and move one or more of the tiles or cards. After doing this, the merchant may execute an operation to associate the data record for the object with the unique identifier for the grid space or region in which the object has been positioned/located. This arrangement of the tiles or cards may then be saved.

Next, the Merchant may choose to generate a display of the objects in the saved arrangement (i.e., in the grid locations specified by the saved values of the unique identifier). Each tile or card for an object may have one or more data display regions. These regions may be used to display data found in a data field in the object's data record (such as price, inventory level, profit margin, popularity rank, etc.), or display the result of evaluating a function or combination of such data regarding the object and/or regarding the underlying business.

Regions on the tile or card representing an object may be used to provide a display of one or more metrics or other information about the object. The metrics or other information may be obtained from a data record that is associated with each object; the data record may contain ERP data, CRM data, HR data, eCommerce data, financial data, etc.

The display of the objects may also be altered to reflect an arrangement of object tile positions as determined by a ranking of the value(s) of the function when evaluated for each object, and a mapping of that ranking to an inferred order (e.g., upper left grid space to lower right, traversed as in reading text, or top to bottom in a column followed by moving to the column to the right).

Figure 14:
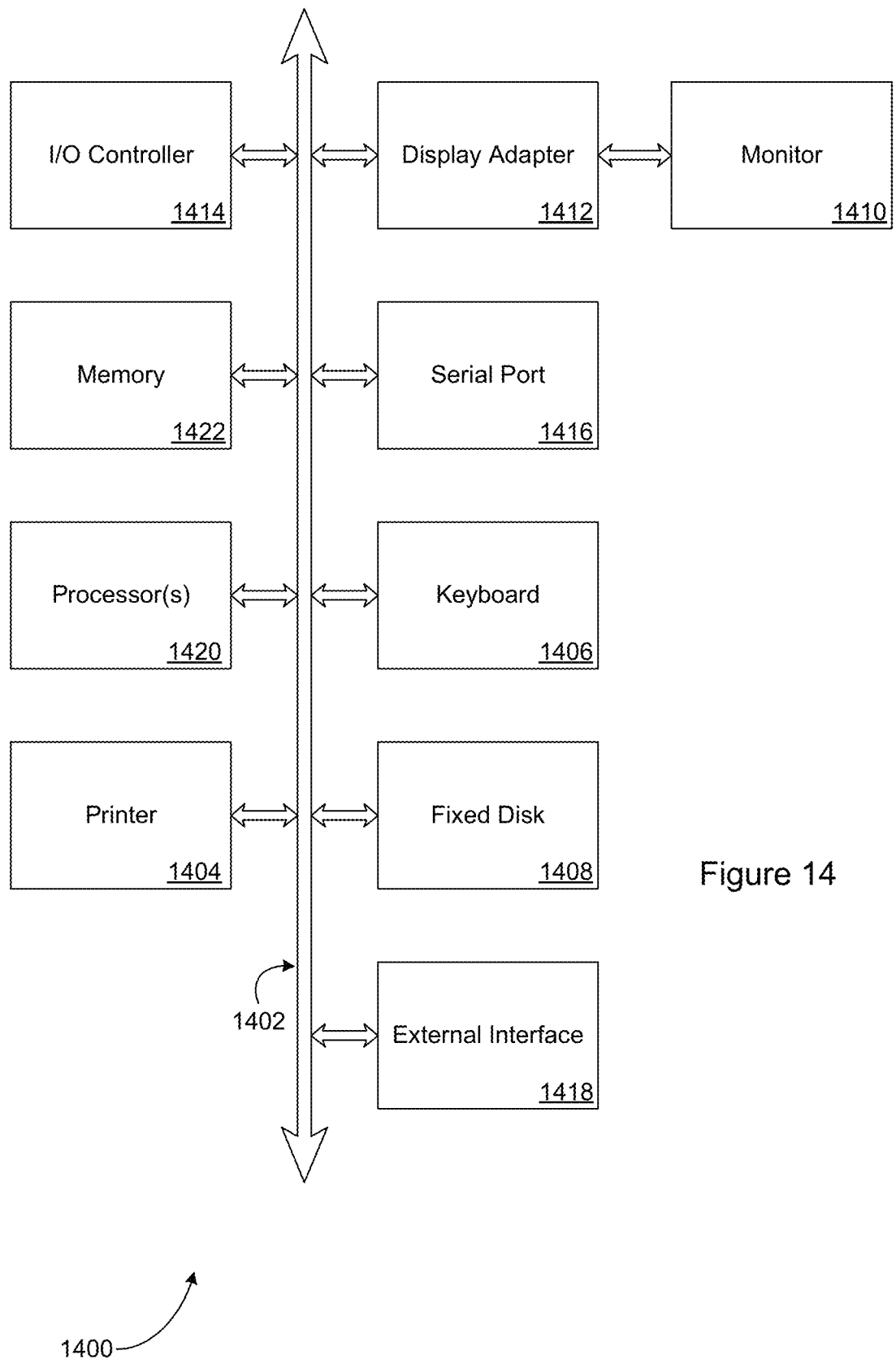
FIG. 14 is a diagram illustrating elements or components that may be present in a computer device or system 1400 configured to implement a method, process, function, or operation in accordance with an embodiment of the invention.

In accordance with one embodiment of the invention, the system, apparatus, methods, processes, functions, and/or operations for enabling efficient sorting, rearranging, and processing of data objects may be wholly or partially implemented in the form of a set of instructions executed by one or more programmed computer processors such as a central processing unit (CPU) or microprocessor. Such processors may be incorporated in an apparatus, server, processing platform, client or other computing device operated by, or in communication with, other components of the system. As an example, FIG. 14 is a diagram illustrating elements or components that may be present in a computer device or system 1400 configured to implement a method, process, function, or operation in accordance with an embodiment of the invention. The subsystems shown in FIG. 14 are interconnected via a system bus 1402. Additional subsystems include a printer 1404, a keyboard 1406, a fixed disk 1408, and a monitor 1410, which is coupled to a display adapter 1412. Peripherals and input/output (I/O) devices, which couple to an I/O controller 1414, can be connected to the computer system by any number of means known in the art, such as a serial port 1416. For example, the serial port 1416 or an external interface 1418 can be utilized to connect the computer device 1400 to further devices and/or systems not shown in FIG. 14 including a wide area network such as the Internet, a mouse input device, and/or a scanner. The interconnection via the system bus 1402 allows one or more processors 1420 to communicate with each subsystem and to control the execution of instructions that may be stored in a system memory 1422 and/or the fixed disk 1408, as well as the exchange of information between subsystems. The system memory 1422 and/or the fixed disk 1408 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, JavaScript, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A method for generating a user interface display, comprising:
   receiving, by a processor, inputs to a business data processing application that is accessible by a plurality of tenants of a multi-tenant data processing system from a user that operate to identify a set of objects that represent sales leads specific to one tenant of the plurality of tenants;
   receiving, by a processor, inputs from the user that operate to identify one or more data fields that are contained in a data record associated with each object of the set of objects and stored in a data storage element accessible by the plurality of tenants of the multi-tenant data processing system, and that the user wishes displayed on a tile or card representing the object;
   generating prior to accepting user input to rearrange the tiles or cards, by a processor, an initial arrangement of the tiles or cards representing the objects on the display based on a sorting operation executed on an ordering value associated with each object, wherein the ordering value is evaluated using weights and factors obtained at least in part from the data fields in real-time or pseudo real-time;
   generating, by a processor, a visual display of each object in the set of objects according to the initial arrangement as a tile or card in a region of the display;
   receiving, by a processor, drag-and-drop inputs from the user that operate to select, move, and indicate a new position or location for one or more of the tiles or cards, wherein the indication of the new position or location takes the one or more of the tiles or cards from a source bucket and places the one or more of the tiles or cards into a destination bucket that represents a single sales representative specific to the one tenant;
   creating or updating, by a processor, a data field in the data record associated with one or more of the objects to indicate that the one or more objects are within the destination bucket, the data field containing a unique identifier for the position of each tile or card displayed on the visual display; and
   initiating a process specific to the destination bucket in response to receiving the drag-and-drop inputs from the user to assign sales lead objects specific to the one tenant and associated with the tile or card to the single sales representative specific to the one tenant.

2. The method of claim 1, wherein the data record associated with each object includes data related to Customer Relationship Management (CRM) for the business or enterprise.

3. The method of claim 1, wherein the data records are contained in a database that is part of the multi-tenant business data processing system.

4. The method of claim 1, wherein the tile or card includes an image or graphic representation of the object and one or more data display regions configured to display one or more data fields of the object's data record.

5. The method of claim 1, wherein the visual display is a grid containing a plurality of regions and the unique identifier for the position of each tile or card displayed on the visual display is a label for the region in which the tile or card representing the object is positioned.

6. The method of claim 5, wherein the initial arrangement of the tiles or cards is based on an ordering of a value associated with each object, with the tile or card for an object having the highest value placed in one corner of the grid and the tile or card for the object having the lowest value placed in a diagonally opposite corner of the grid.

7. The method of claim 4, wherein the data display regions display data values representing real-time or pseudo real-time operational, financial or status information for the business or enterprise.

8. The method of claim 7, wherein the operational, financial or status information includes one or more of:
an inventory level for an inventory item;
a price for the inventory item;
an estimated delivery date for the inventory item;
a profit margin for the inventory item;
a measure of in-transit inventory for the inventory item; or
a current promotional code for the inventory item.

9. An apparatus, comprising:
an electronic data processing element;
a set of instructions stored on a non-transient medium and executable by the electronic data processing element, which when executed cause the apparatus to
receive inputs to a business data processing application that is accessible by a plurality of tenants of a multi-tenant data processing system from a user that operate to identify a set of objects that represent sales leads specific to one tenant of the plurality of tenants;
receive inputs from the user that operate to identify one or more data fields that are contained in a data record associated with each object of the set of objects and stored in a data storage element accessible by the plurality of tenants of the multi-tenant data processing system, and that the user wishes displayed on a tile or card representing the object;
prior to accepting user input to rearrange the tiles or cards, generate an initial arrangement of the tiles or cards representing the objects on the display based on a sorting operation executed on an ordering value associated with each object, wherein the ordering value is evaluated using weights and factors obtained at least in part from the data fields in real-time or pseudo real-time;
generate a visual display of each object in the set of objects according to the initial arrangement as a tile or card in a region of the display;
receive drag-and-drop inputs from the user that operate to select, move, and indicate the new position or location for one or more of the tiles or cards, wherein the indication of the new position or location takes the one or more of the tiles or card from a source bucket and places the one or more of the tiles or cards into a destination bucket that represents a single sales representative specific to the one tenant;
create or update a data field in the data record associated with one or more of the objects to indicate that the one or more objects are within the destination bucket, the data field containing a unique identifier for the position of each tile or card displayed on the visual display; and
initiate a process specific to the destination bucket in response to receiving the drag-and-drop inputs from the user to assign sales lead objects specific to the one tenant and associated with the tile or card to the single sales representative specific to the one tenant.

10. The apparatus of claim 9, wherein the data record associated with each object includes Enterprise Resource Planning (ERP) data of the business or enterprise.

11. The apparatus of claim 9, wherein the tile or card includes an image or graphic representation of the object and one or more data display regions configured to display one or more data fields of the object's data record.

12. The apparatus of claim 9, wherein the visual display is a grid containing a plurality of regions and the unique identifier for the position of each tile or card displayed on the visual display is a label for the region in which the tile or card representing the object is positioned.

13. The apparatus of claim 9, wherein the initial arrangement of the tiles or cards is based on an ordering of a value associated with each object, with the tile or card for an object having the highest value placed in one corner of the grid and the tile or card for the object having the lowest value placed in a diagonally opposite corner of the grid.

14. The apparatus of claim 11, wherein the data display regions display data values representing real-time or pseudo real-time operational, financial or status information for the business or enterprise.

15. A multi-tenant data processing system, comprising:
an electronic data processing element;
one or more business related data processing applications installed in the system and accessible by a plurality of tenants of the multi-tenant data processing system;
a data storage element accessible by the plurality of tenants of the multi-tenant data processing system;
a set of instructions stored on a non-transient medium and executable by the electronic data processing element, which when executed cause the system to
receive inputs to a business data processing application that is accessible by the plurality of tenants of the multi-tenant data processing system from a user that operate to identify a set of objects that represent sales leads specific to one tenant of the plurality of tenants;
receive inputs from the user that operate to identify one or more data fields that are contained in a data record associated with each object of the set of objects and stored in the data storage element accessible by the plurality of tenants of the multi-tenant data processing system, and that the user wishes displayed on a tile or card representing the object;
prior to accepting user input to rearrange the tiles or cards, generate an initial arrangement of the tiles or cards representing the objects on the display based on a sorting operation executed on the ordering value associated with each object, wherein an ordering value is evaluated using weights and factors obtained at least in part from the data fields in real-time or pseudo real-time;
generate a visual display of each object in the set of objects according to the initial arrangement as a tile or card in a region of the display;
receive drag-and-drop inputs from the user that operate to select, move, and indicate a new position or location for one or more of the tiles or cards, wherein the indication of the new position or location takes the one or more of the tiles or cards from a source bucket and places the one or more of the tiles or cards into a destination bucket that represents a single sales representative specific to the one tenant;

create or update a data field in the data record associated with one or more of the objects to indicate that the one or more objects are within the destination bucket, the data field containing a unique identifier for the position of each tile or card displayed on the visual display; and initiate a process specific to the destination bucket in response to receiving the drag-and-drop inputs from the user to assign sales lead objects specific to the one tenant and associated with the tile or card to the single sales representative specific to the one tenant.

16. The method of claim 4, further comprising:

in response to receiving the drag-and-drop inputs that operate to select, move, and indicate a new position or location for one of the tiles or cards,
  (i) updating at least one of the one or more data fields of the object's data record, and
  (ii) displaying the updated data field in the associated display region of the tile.

17. The method of claim 1, wherein the unique identifier for the position is a sequence number indicating the placement of a card or tile among others on a grid, and wherein creating or updating the data field includes causing other sequence numbers of objects already assigned to the destination bucket to be incremented or decremented.

* * * * *